United States Patent
Foye et al.

(10) Patent No.: US 7,954,901 B2
(45) Date of Patent: Jun. 7, 2011

(54) CONFIGURABLE RESTRAINT SYSTEM

(76) Inventors: Christopher W. Foye, Indianapolis, IN (US); Aaron J. Acton, Whitestown, IN (US); Guy R. Dingman, Laura, OH (US)

(*) Notice: Subject to any disclaimer, the term of this patent is extended or adjusted under 35 U.S.C. 154(b) by 75 days.

(21) Appl. No.: 12/297,585

(22) PCT Filed: Aug. 27, 2007

(86) PCT No.: PCT/US2007/076883
§ 371 (c)(1),
(2), (4) Date: Oct. 17, 2008

(87) PCT Pub. No.: WO2008/027832
PCT Pub. Date: Mar. 6, 2008

(65) Prior Publication Data
US 2009/0174250 A1 Jul. 9, 2009

Related U.S. Application Data

(60) Provisional application No. 60/823,670, filed on Aug. 28, 2006, provisional application No. 60/946,889, filed on Jun. 28, 2007.

(51) Int. Cl.
*A47D 15/00* (2006.01)

(52) U.S. Cl. ........ 297/473; 297/464; 297/475; 297/481; 297/483; 297/232; 280/801.2; 280/806

(58) Field of Classification Search .................. 297/464, 297/473–475, 481, 483, 232; 280/801.2, 280/802, 806
See application file for complete search history.

(56) References Cited

U.S. PATENT DOCUMENTS

| | | | |
|---|---|---|---|
| 2,964,100 A | 12/1960 | McCall |
| 3,287,061 A | 11/1966 | Nicholas |
| 3,768,862 A | 10/1973 | Williams, Jr. |
| 3,832,002 A | 8/1974 | Eggert, Jr. et al. |
| 3,994,513 A | 11/1976 | Courtis et al. |

(Continued)

FOREIGN PATENT DOCUMENTS

DE 35 09 984 A1 6/1986

(Continued)

OTHER PUBLICATIONS

International Search Report and Written Opinion of the International Searching Authority based on PCT/US2007/076883 completed Aug. 11, 2008.

(Continued)

*Primary Examiner* — Laurie K Cranmer
(74) *Attorney, Agent, or Firm* — Barnes & Thornburg LLP

(57) ABSTRACT

A configurable restraint system (10-10''') for a vehicle seat (12, 12') may comprise a first restraint harness (30-30") coupled to a first engagement member (32), a second restraint harness (34-34") coupled to a second engagement member (36), and a third engagement member (50-50"") configured to be movable between first and second positions relative to the vehicle seat. The first position may be located relative to the vehicle seat so that the first engagement member (32) may releasably engage the third engagement member (50-50"") to restrain a first occupant of the vehicle seat via the first restraint harness (30-30"). The second position may be located relative to the vehicle seat so that the second engagement member (36) may alternatively releasably engage the third engagement member (50-50"") to alternatively restrain the first occupant of the vehicle seat via the second restraint harness (34-34").

26 Claims, 15 Drawing Sheets

U.S. PATENT DOCUMENTS

| | | | |
|---|---|---|---|
| 4,314,715 A | 2/1982 | Duguet et al. |
| 4,316,633 A | 2/1982 | Zaccariotto |
| 4,445,722 A | 5/1984 | Schaper |
| 4,500,115 A | 2/1985 | Ono |
| 4,556,255 A | 12/1985 | Kawai |
| 4,732,409 A | 3/1988 | Colasanti |
| 4,765,651 A | 8/1988 | Unger |
| 4,810,037 A | 3/1989 | Takagi |
| 4,915,451 A | 4/1990 | Forget et al. |
| 4,919,488 A | 4/1990 | Deegener et al. |
| 5,009,469 A | 4/1991 | Mouri |
| 5,082,325 A | 1/1992 | Sedlack |
| 5,141,352 A | 8/1992 | McManus et al. |
| 5,253,924 A | 10/1993 | Glance |
| 5,294,184 A | 3/1994 | Blake et al. |
| 5,332,261 A | 7/1994 | Siepierski |
| 5,431,447 A | 7/1995 | Bauer |
| 5,575,533 A | 11/1996 | Glance |
| 5,624,135 A | 4/1997 | Symonds |
| 5,647,611 A | 7/1997 | Boyd et al. |
| 5,676,423 A * | 10/1997 | Pedronno et al. | 297/378.1 |
| 5,855,047 A | 1/1999 | Haas |
| 6,217,068 B1 | 4/2001 | Trainum et al. |
| 6,250,680 B1 | 6/2001 | Moker |
| 6,312,056 B1 * | 11/2001 | Murphy et al. | 297/464 |
| 6,328,386 B1 * | 12/2001 | Good | 297/483 |
| 6,390,560 B1 | 5/2002 | Gandhi et al. |
| 6,412,876 B2 | 7/2002 | Nishide |
| 6,508,515 B2 * | 1/2003 | Vits et al. | 297/483 |
| 6,543,722 B1 | 4/2003 | Parrow et al. |
| 6,554,356 B1 | 4/2003 | Crose |
| 6,565,120 B2 | 5/2003 | Ganesan |
| 6,581,969 B2 | 6/2003 | Nishide |
| 6,582,015 B2 | 6/2003 | Jessup et al. |
| 6,666,520 B2 | 12/2003 | Murphy et al. |
| 6,676,219 B1 * | 1/2004 | Brewer | 297/485 |
| 6,811,186 B1 | 11/2004 | Fraley et al. |
| 6,886,889 B2 | 5/2005 | Vits et al. |
| 6,902,194 B2 | 6/2005 | Russell et al. |
| 6,935,701 B1 | 8/2005 | Arnold et al. |
| 6,938,959 B1 | 9/2005 | Borunda et al. |
| 7,000,994 B2 | 2/2006 | Leighton |
| 7,021,662 B2 | 4/2006 | Hoffmann et al. |
| 7,040,696 B2 | 5/2006 | Vits et al. |
| 7,063,389 B2 * | 6/2006 | Kennedy, Sr. | 297/483 |
| 7,063,390 B2 * | 6/2006 | Suzuki et al. | 297/483 |
| 7,131,668 B2 | 11/2006 | Go |
| 7,156,469 B2 * | 1/2007 | Kennedy, Sr. | 297/483 |
| 7,226,131 B2 | 6/2007 | Meneses et al. |
| 7,229,135 B2 | 6/2007 | Hyatt et al. |
| 7,500,722 B2 * | 3/2009 | Morris | 297/483 |
| 7,591,510 B1 | 9/2009 | Giampavolo |
| 7,784,867 B2 | 8/2010 | Lamparter |
| 7,789,460 B2 | 9/2010 | Lamparter et al. |
| 2001/0008337 A1 | 7/2001 | Ganesan |
| 2002/0079734 A1 * | 6/2002 | Murphy et al. | 297/483 |
| 2003/0173817 A1 | 9/2003 | Vits et al. |
| 2006/0119091 A1 | 6/2006 | Takao et al. |
| 2008/0030063 A1 | 2/2008 | Tabata et al. |
| 2008/0191540 A1 * | 8/2008 | Morris | 297/474 |
| 2008/0211275 A1 | 9/2008 | Lamparter et al. |
| 2008/0309111 A1 | 12/2008 | Marriott et al. |
| 2010/0052378 A1 * | 3/2010 | Marriott et al. | 297/216.1 |

FOREIGN PATENT DOCUMENTS

| | | |
|---|---|---|
| DE | 4001119 A1 | 7/1991 |
| DE | 198 00 071 A1 | 7/1999 |
| EP | 1122135 | 8/2001 |
| EP | 1122135 A1 | 8/2001 |
| FR | 2 658 459 A1 | 2/1990 |
| FR | 2 658 459 | 8/1991 |
| FR | 2774959 | 8/1999 |
| FR | 2774959 A1 | 8/1999 |
| FR | 2 804 391 A1 | 2/2000 |
| GB | 2 261 809 A | 6/1993 |
| JP | 3-227756 A | 10/1991 |
| JP | 5-147499 | 6/1993 |
| JP | 6-247254 | 6/1994 |
| WO | 9200209 A1 | 1/1992 |

OTHER PUBLICATIONS

International Search Report and Written Opinion of the International Search Authority based on PCT/US2007/076883 dated Sep. 10, 2009 (10 pages).

European Search Report regarding EP 07814474.2, dated Jan. 19, 2010 (6 pages).

SynTec Seating Solutions brochure by M2K LLC (4 pages).

The New 39" Student Safety Seat brochure by The C.E. White Co. (1 page).

* cited by examiner

000# CONFIGURABLE RESTRAINT SYSTEM

CROSS-REFERENCE TO RELATED APPLICATIONS

This application is the U.S. national phase of PCT/US2007/076883 filed Aug. 27, 2007. PCT/US2007/076883 claims benefit claims the benefit of U.S. provisional patent application Ser. No. 60/823,670 filed Aug. 28, 2006 and U.S. provisional patent application Ser. No. 60/946,889 filed Jun. 28, 2007 are hereby expressly incorporated by reference herein.

FIELD OF THE INVENTION

The present invention relates generally to restraint systems for occupant transportation vehicles, and more specifically to such systems that are configurable to restrain a variable number of occupants of a transportation vehicle seat.

BACKGROUND

It is generally known that occupant seats in occupant transportation vehicles may be configured to accommodate variable numbers of variously sized occupants. It is desirable with such seats to provide a restraint system that may be configurable to restrain various combinations of such occupants.

SUMMARY

The present invention may comprise one or more of the features recited in the attached claims, and/or one or more of the following features and combinations thereof. A configurable restraint system for a vehicle seat may comprise a first restraint harness mounted to the vehicle seat and coupled to a first engagement member, a second restraint harness mounted to the vehicle seat and coupled to a second engagement member, and a third engagement member mounted to the vehicle seat and configured to be movable between first and second positions relative to the vehicle seat. The first position may be located relative to the vehicle seat so that the first engagement member may releasably engage the third engagement member to restrain a first occupant of the vehicle seat via the first restraint harness. The second position may be located relative to the vehicle seat so that the second engagement member may alternatively releasably engage the third engagement member to alternatively restrain the first occupant of the vehicle seat via the second restraint harness.

The restraint system may further comprise a fourth engagement member mounted to the vehicle seat. The first engagement member may releasably engage the fourth engagement member when the third engagement member is in the second position to restrain a second occupant of the vehicle seat. The restraint system may further comprise a third restraint harness mounted to the vehicle seat and coupled to a fifth engagement member, and a sixth engagement member coupled to the third engagement member and movable with the third engagement member between the first and second positions. The sixth engagement member may be engageable with the fifth engagement member when the third and the sixth engagement members are in the first position to restrain a second occupant of the vehicle seat via the third restraint harness. The sixth engagement member may be engageable with the fifth engagement member when the third and sixth engagement members are in the second position to restrain a third occupant of the vehicle seat via the third restraint harness.

The fourth engagement member may be movable between a stowed position and an operative position. The restraint system may further comprise a web having one end attached to the fourth engagement member and an opposite end attached to a frame of the vehicle seat.

The first, second and fifth engagement members may each comprise tongue members, and the third, fourth and sixth engagement members may each comprise buckle members.

The restraint system may further comprise a flexible member attached between the third engagement member and a frame of the vehicle seat. The flexible member may comprise one or more of a web, a belt, a strap, a tether and a cable.

The restraint system may further comprise at least one flexible member attached between a frame of the vehicle seat and both of the third and sixth engagement members. The at least one flexible member may comprise one or more of a web, a belt, a strap, a tether and a cable.

The restraint system may further comprise a base member mounted to a frame of the vehicle seat. The base member may define the first and second positions. The third engagement member may be coupled to the base member. The third and sixth engagement members may both be coupled to the base member.

A configurable restraint system for a transportation vehicle seat may comprise a first restraint harness extending from one end of the vehicle seat and coupled to a first engagement member, a second restraint harness extending from an opposite end of the vehicle seat and coupled to a second engagement member, a third restraint harness mounted to the vehicle seat between the first and second restraint harnesses and coupled to a third engagement member, and a fourth engagement member mounted to the vehicle seat. The fourth engagement member may be configured to be movable between first and second positions. The first position may be located near a center of the vehicle seat so that the first engagement member may releasably engage the fourth engagement member to restrain a first occupant of the vehicle seat via the first restraint harness. The second position may be located between the center and the opposite end of the vehicle seat so that the third engagement member may alternatively releasably engage the fourth engagement member to alternatively restrain the first occupant of the vehicle seat via the third restraint harness.

The restraint system may further comprise a fifth engagement member secured to and movable with the fourth engagement member. The second engagement member may releasably engage the fifth engagement member to restrain a second occupant of the vehicle seat via the second restraint harness when the fourth engagement member is in the first position. The second engagement member may alternatively releasably engage the fifth engagement member to alternatively restrain the second occupant of the vehicle seat via the second restraint harness when the fourth engagement member is in the second position.

The vehicle seat may define a bight between the seat back and the seat bottom. The restraint system may further comprise a sixth engagement member movable between operative and stowed positions relative to the vehicle seat. The operative position may extend from the bight between the center and the one end of the vehicle seat. The stowed position may extend at least partially into the bight and away from the seat bottom and the seat back. The sixth engagement member may be moved to the stowed position when the fourth engagement member is in the first position so that the sixth engagement member will not interfere with the first occupant of the vehicle seat. The sixth engagement member may be moved to the operative position when the fourth engagement member is in the second position so that the first engagement member may releasably engage the sixth engagement member to restrain a third occupant of the vehicle seat via the first restraint harness. A web may have one end secured to the vehicle seat frame and an opposite end secured to the sixth engagement member. Alternatively, the sixth engagement member may be recessed within the seat bottom between the center and the one end of the vehicle seat. In any case, the third restraint harness and the sixth engagement member may both be unused when the vehicle seat is occupied by only the first and second occupants.

The first, second and third engagement members may each comprise tongue members. The fourth engagement member may comprise a buckle member configured to releasably engage either of the first and third tongue members. The fifth engagement member may comprise another buckle member configured to releasably engage the second tongue member. The sixth engagement member may comprise yet another buckle member configured to releasably engage the first tongue member.

The seat back and the seat bottom may be mounted to a vehicle seat frame. The restraint system may further comprise a base member secured to the vehicle frame. The base member may be configured to be coupled to the fourth engagement member. The base member may define the first and second positions of the fourth engagement member. The fourth engagement member may be movable relative to the base member between the first and second positions. The base member may define a channel configured to receive therein a protrusion extending from the fourth engagement member. The fourth engagement member may be movable along the channel between the first and second positions. The channel may define opposite channel ends defining the first and second positions respectively of the fourth engagement member. The restraint system may further comprise a locking mechanism configured to releasably secure the fourth engagement member to the base member in the first position and to releasably secure the fourth engagement member to the base member in the second position.

The fourth engagement member may extend from the bight of the vehicle seat. Alternatively, the base member may be at least partially recessed within the seat bottom, and the fourth engagement member may extend from the seat bottom.

A configurable restraint system for a transportation vehicle seat may comprise a first restraint harness extending from one end of the vehicle seat and coupled to a first tongue member, a second restraint harness extending from an opposite end of the vehicle seat and coupled to a second tongue member, a third restraint harness mounted to the vehicle seat between the first and second restraint harnesses and coupled to a third tongue member, and a movable buckle member coupled to the vehicle seat. The movable buckle member may have a first buckle secured thereto. The movable buckle member may be configured to be movable between first and second positions relative to the vehicle seat. The first position may be near a center of the vehicle seat so that the first tongue may releasably engage the first buckle to restrain a first occupant of the vehicle seat via the first restraint harness. The second position may be between the center and the opposite end of the vehicle seat so that the third tongue may alternatively releasably engage the first buckle to alternatively secure the first occupant of the vehicle seat via the third restraint harness.

The restraint system may further comprise a second buckle secured to the movable buckle member. The second tongue may releasably engage the second buckle to restrain a second occupant of the vehicle seat via the second restraint harness when the movable buckle member is in either of the first and second positions. The third restraint harness may be unused when the movable buckle member is in the first position and the first occupant is restrained in the vehicle seat via the first restraint harness.

The restraint harness may further comprise a third buckle coupled to a frame of the vehicle seat and positioned between the center and the one end of the vehicle seat. The first tongue member may releasably engage the third buckle to restrain a third occupant of the vehicle seat via the first restraint harness when the movable buckle member is in the second position. The vehicle seat may define a bight between a seat bottom and a seat back. The third buckle may be movable between operative and stowed positions relative to the vehicle seat. The operative position may extend from the bight between the center and the one end of the vehicle seat. The stowed position may extend at least partially into the bight and away from the seat bottom and the seat back. The third buckle may be moved to the stowed position when the movable buckle member is in the first position so that the third buckle will not interfere with the first occupant of the vehicle seat. The third buckle may be moved to the operative position when the movable buckle member is in the second position so that the first tongue member may releasably engage the third buckle to restrain the third occupant of the vehicle seat via the first restraint harness. Alternatively, the third buckle may be recessed within the seat bottom.

The movable buckle member may comprise a base member secured to the vehicle frame. The movable buckle member may be movably coupled to the base member. The base member may define the first and second positions of the movable buckle member. The movable buckle member may be movable relative to the base member between the first and second positions. The base member may define a channel configured to receive therein a protrusion extending from the movable buckle member. The movable buckle member may be movable along the channel between the first and second positions. The channel may define opposite channel ends defining the first and second positions respectively of the movable buckle member. The restraint system may further comprise a locking mechanism configured to releasably secure the movable buckle member to the base member in the first position and to releasably secure the movable buckle member to the base member in the second position. The first and second buckles may extend from the bight. Alternatively, the movable buckle member may be at least partially recessed within the seat bottom, and the first and second buckles may extend from the seat bottom.

The first, second and third restraint harnesses may each comprise a separate combination shoulder and lap harness. One end of each of the separate combination shoulder and lap harnesses may be coupled to the vehicle seat frame adjacent to the seat bottom. An opposite end of each of the separate combination shoulder and lap harnesses may extend at least partially through the seat back and then be coupled to the vehicle seat frame. The first, second and third engagement members may each be slidably received on a respective one of the separate combination shoulder and lap harnesses between the one and opposite ends thereof. For example, each of the first, second and third engagement members may define a slot that is configured to receive a respective one of the separate combination shoulder and lap harnesses therethrough. Each of the combination shoulder and lap harnesses may include a retractor mounted to the vehicle seat frame with the one or opposite end thereof attached thereto.

A configurable restraint system for a vehicle seat may comprise a first restraint harness coupled to a first engagement member, a second restraint harness coupled to a second engagement member and a third engagement member mounted to the vehicle seat. The first restraint harness may extend from one end of the vehicle seat. The second restraint harness may extend from an opposite end of the vehicle seat. The third engagement member may be configured to be movable between first and second positions relative to the vehicle seat. The first position may be located relative to the vehicle seat so that the first engagement member may releasably engage the third engagement member to restrain a first occupant of the vehicle seat via the first restraint harness. The second position may be located relative to the vehicle seat so that the second engagement member may alternatively releasably engage the third engagement member to alternatively restrain the first occupant of the vehicle seat via the second restraint harness.

The vehicle seat may be a bench-type vehicle seat. Alternatively or additionally, the vehicle seat may be a school bus seat.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
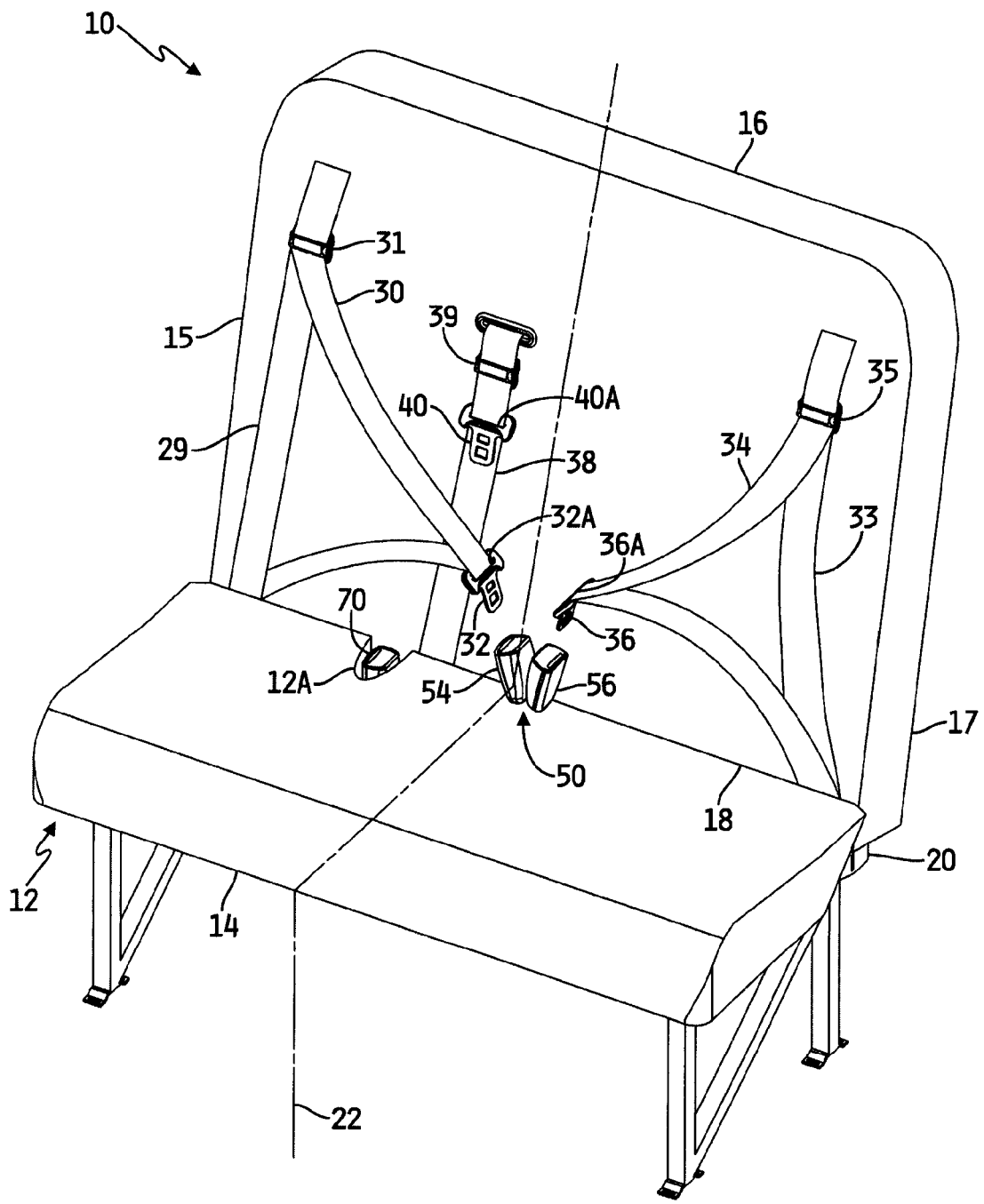
FIG. 1 is a diagram of one illustrative embodiment of a configurable restraint system for a transportation vehicle seat that is configured to restrain up to two occupants of the vehicle seat.
Figure 2A:
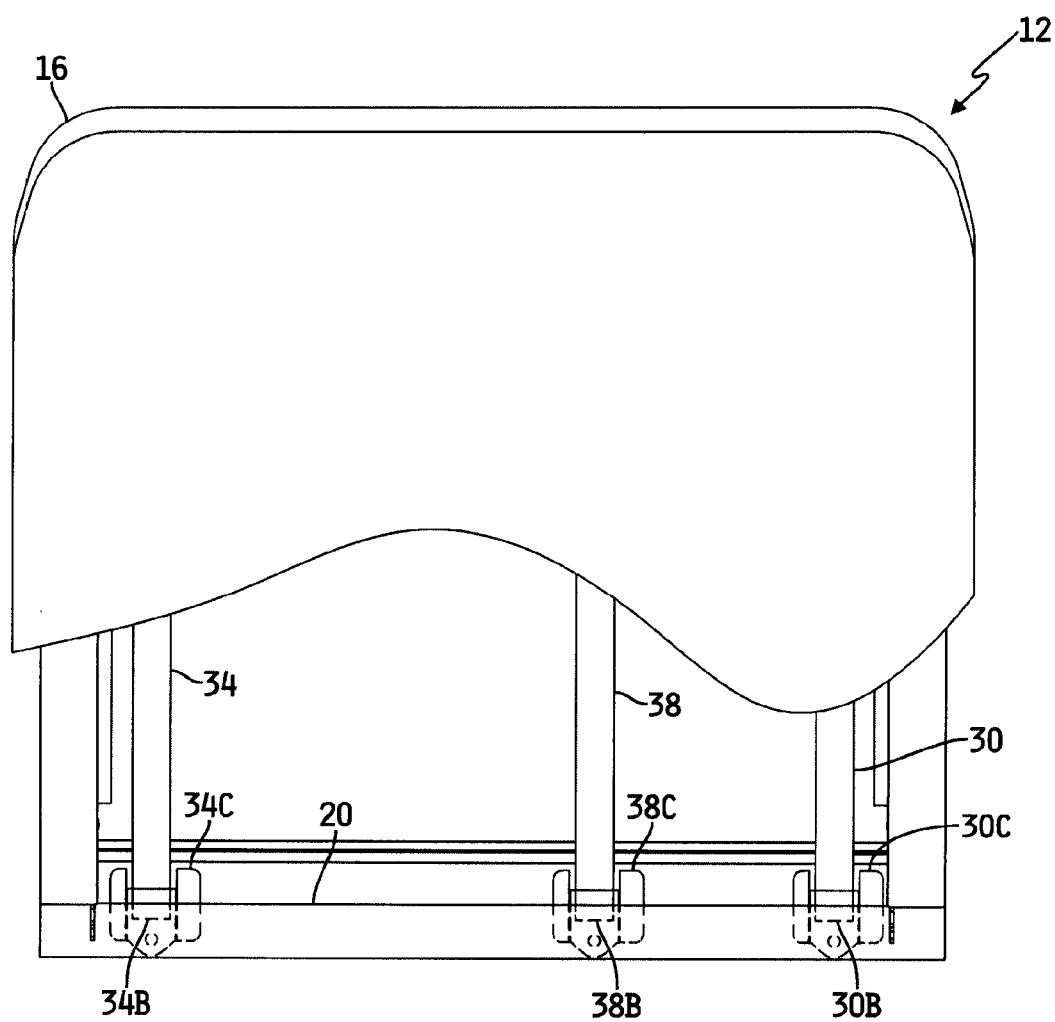
FIG. 2A is a partial cutaway view of the seat back portion of the vehicle seat of FIG. 1 illustrating one embodiment of the coupling of one end of the restraint harnesses to the vehicle seat.
Figure 3:
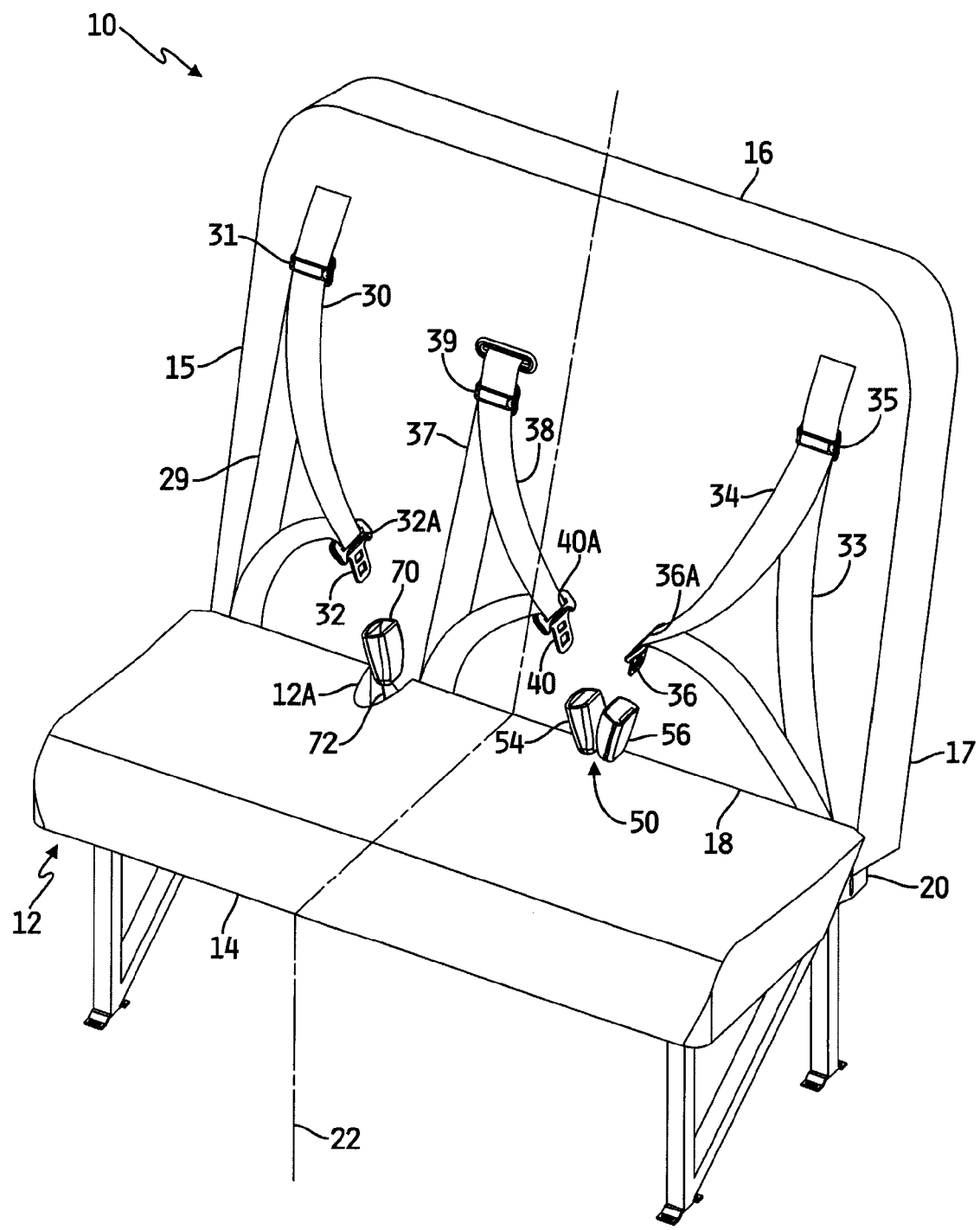
FIG. 3 is a diagram of the configurable restraint system of FIG. 1 that is configured to restrain up to three occupants of the vehicle seat.

Referring now to FIGS. 1, 2A and 3, diagrams of one embodiment of a configurable restraint system 10 for a vehicle seat 12 of an occupant transportation vehicle are shown. The vehicle seat 12 includes a seat bottom 14 and a seat back 16 that are both mounted to a frame 20 (see FIGS. 2A and/or 2B) of the vehicle seat 12. The vehicle seat 12 defines a bight 18 between the seat bottom 14 and the seat back 16 as shown in FIGS. 1 and 3. Illustratively, the vehicle seat 12 may be any vehicle seat that is sized or otherwise configured to be occupied by at least one relatively large occupant, e.g., high-school aged teenager or adult, or to alternatively to be occupied by a greater number of relatively smaller occupants, e.g., toddlers, elementary, middle-school and/or junior high-school aged children, or the like. As one specific example, the vehicle seat 12 may be a conventional school bus seat that is sized and configured to be occupied by two average-sized high-school aged persons or adults, or to alternatively be occupied by three average-sized elementary, middle and/or junior high-school students. In any case, the vehicle seat 12 is configured to be mounted in an occupant transportation vehicle, examples of which include, but are not limited to, conventional motor vehicles, including cars, trucks, busses, industrial machinery, utility vehicles and the like, conventional aircraft or watercraft, single or multiple-track rail vehicles including trains, trams, trolleys, monorail transport systems and the like, and amusement park rides.

In the illustrated embodiment, the restraint system 10 includes a restraint harness or web 30 that is mounted to the vehicle seat 12 adjacent to one end 15 thereof. Illustratively, the restraint harness 30 is a conventional three-point restraint harness having one end mounted to the seat bottom 14 or to the vehicle seat frame 20 adjacent to the seat bottom 14 and/or adjacent to the bight 18, in a conventional manner. An opposite end of the restraint harness 30 extends into an upper portion of the seat back 16 as illustrated in FIG. 1. As shown in FIG. 2A, for example, the end 30B of the restraint harness 30 extends through the upper portion of the seat back 16 and extends downwardly along a back portion of the seat back 16 and into engagement with a conventional retractor 30C that is mounted to the vehicle seat frame 20. Illustratively, the retractor 30C is a conventional inertial locking retractor, although other conventional retractor types are contemplated by this disclosure. This disclosure further contemplates that the restraint harness 30 may alternatively be generally implemented as an "N"-point restraint harness, where N may be any positive integer greater than 1. In the embodiment illustrated in FIGS. 1 and 3, the restraint harness 30 further includes an additional fixed-position web 29 that extends between an upper area of the seat back 16 and the seat frame 20. A conventional web height adjuster 31 is coupled between the restraint harness 30 and the fixed-position web 29, and the position of the web height adjuster 29 may be adjusted in a conventional manner relative to the restraint harness 30 and web 29 to accommodate various-sized occupants.

The restraint harness 30 is coupled to a conventional engagement member 32 that is configured to releasably engage a complementarily configured engagement member. In the illustrated embodiment, for example, the engagement member 32 is provided in the form of a conventional tongue member defining a slot 32A that is sized and configured to receive the restraint harness 30 therethrough such that the tongue member 32 may freely slide along the length the restraint harness 30 while at all times being coupled thereto. The illustrated tongue member 32 includes a conventional tongue structure configured to releasably engage a complementarily configured conventional buckle as is known in the art. Alternatively, the engagement member 32 may be a conventional buckle that is configured to releasably engage a complementarily configured conventional tongue member. In any case, the length of the restraint harness 30 is adjustable in a conventional manner via the retractor 30C, and the engagement member 32 is adjustably positionable along the length of the restraint harness 30, so that the combination restraint harness 30 and engagement member 32 may be suitably adjusted to accommodate variously sized passengers.

In the illustrated embodiment, the restraint system 10 further includes a restraint harness or web 34 that is mounted to the vehicle seat 12 adjacent to an end 17 of the vehicle seat 12 that is opposite to the end 15 thereof. Illustratively, the restraint harness 34 is a conventional three-point restraint harness having one end mounted to the seat bottom 14 or to the vehicle seat frame 20 adjacent to the seat bottom 14 and/or adjacent to the bight 18, in a conventional manner. An opposite end 34B of the restraint harness 34 extends into the upper portion of the seat back 16 as illustrated in FIGS. 1 and 3. As shown in FIG. 2A, the end 34B of the restraint harness 34 extends through the upper portion of the seat back 16 and extends downwardly along a back portion of the seat back 16 and into engagement with a conventional retractor 34C that is mounted to the vehicle seat frame 20. Illustratively, the retractor 34C is a conventional inertial locking retractor, although other conventional retractor types are contemplated by this disclosure. This disclosure further contemplates that the restraint harness 34 may alternatively be generally implemented as an "N"-point restraint harness, where N may be any positive integer greater than 1. In the embodiment illustrated in FIGS. 1 and 3, the restraint harness 34 further includes an additional fixed-position web 33 that extends between an upper area of the seat back 16 and the seat frame 20. A conventional web height adjuster 35 is coupled between the restraint harness 34 and the fixed-position web 33, and the position of the web height adjuster 35 may be adjusted in a conventional manner relative to the restraint harness 34 and web 33 to accommodate various-sized occupants.

The restraint harness 34 is coupled to a conventional engagement member 36 that is configured to releasably engage a complementarily configured engagement member. In the illustrated embodiment, for example, the engagement member 36 is provided in the form of a conventional tongue member defining a slot 36A that is sized and configured to receive the restraint harness 34 therethrough such that the tongue member 36 may freely slide along the length the restraint harness 34 while at all times being coupled thereto. The illustrated tongue member 36 includes a conventional tongue structure configured to releasably engage a complementarily configured conventional buckle as is known in the art. Alternatively, the engagement member 34 may be a conventional buckle that is configured to releasably engage a complementarily configured conventional tongue member. In any case, the length of the restraint harness 34 is adjustable in a conventional manner via the retractor 34C, and the engagement member 36 is adjustably positionable along the length of the restraint harness 34, so that the combination restraint harness 34 and engagement member 36 may be suitably adjusted to accommodate variously sized passengers.

In the illustrated embodiment, the restraint system 10 further includes a restraint harness or web 38 that is mounted to the vehicle seat 12 between the restraint harnesses 30 and 34. Illustratively, the restraint harness 38 is a conventional three-point restraint harness having one end mounted to the seat bottom 14 or to the vehicle seat frame 20 adjacent to the seat bottom 14 and/or adjacent to the bight 18, in a conventional manner. An opposite end 38B of the restraint harness 38 extends into the upper portion of the seat back 16 as illustrated in FIGS. 1 and 3. As shown in FIG. 2A, the end 38B of the restraint harness 38 extends through the upper portion of the seat back 16 and extends downwardly along a back portion of the seat back 16 and into engagement with a conventional retractor 38C that is mounted to the vehicle seat frame 20. Illustratively, the retractor 38C is a conventional inertial locking retractor, although other conventional retractor types are contemplated by this disclosure. This disclosure further contemplates that the restraint harness 38 may alternatively be generally implemented as an "N"-point restraint harness, where N may be any positive integer greater than 1. In the embodiment illustrated in FIGS. 1 and 3, the restraint harness 38 further includes an additional fixed-position web 37 that extends between an upper area of the seat back 16 and the seat frame 20. A conventional web height adjuster 39 is coupled between the restraint harness 38 and the fixed-position web 37, and the position of the web height adjuster 39 may be adjusted in a conventional manner relative to the restraint harness 38 and web 37 to accommodate various-sized occupants.

The restraint harness 38 is coupled to a conventional engagement member 40 that is configured to releasably engage a complementarily configured engagement member. In the illustrated embodiment, for example, the engagement member 40 is provided in the form of a conventional tongue member defining a slot 40A that is sized and configured to receive the restraint harness 38 therethrough such that the tongue member 40 may freely slide along the length the restraint harness 38 while at all times being coupled thereto. The illustrated tongue member 40 includes a conventional tongue structure configured to releasably engage a complementarily configured conventional buckle as is known in the art. Alternatively, the engagement member 40 may be a conventional buckle that is configured to releasably engage a complementarily configured conventional tongue member. In any case, the length of the restraint harness 38 is adjustable in a conventional manner via the retractor 38C, and the engagement member 40 is adjustably positionable along the length of the restraint harness 38, so that the combination restraint harness 38 and engagement member 40 may be suitably adjusted to accommodate variously sized passengers.

Figure 2B:
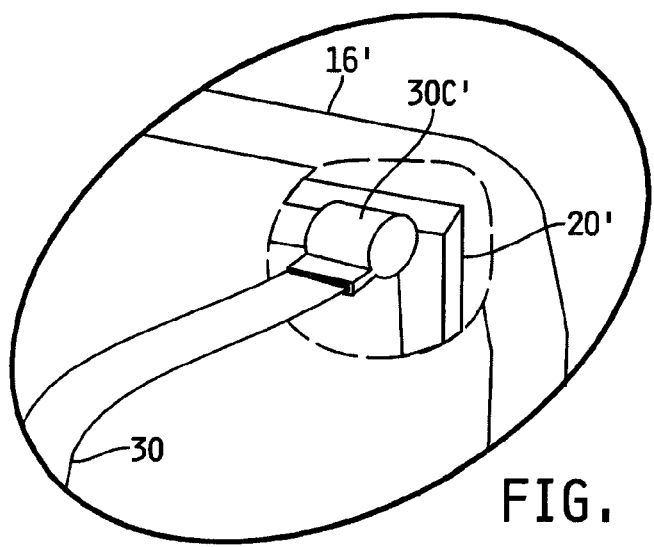
FIG. 2B is a diagram of the vehicle seat of FIG. 1 illustrating an alternate embodiment of the coupling of at least one end of any of the restraint harnesses to the vehicle seat.

In an alternate embodiment of the restraint system 10, the ends 30B, 34B and/or 38B of any one or more of the restraint harnesses 30, 34 and 38 respectively may extend through an upper portion of the seat back and into engagement with a conventional retractor that is mounted to an upper frame 20' that forms part of the seat back 16 at or near a top 16' of the seat back 16. Referring to FIG. 2B, for example, an alternate embodiment of the vehicle seat 12' is shown wherein the end 30B of the restraint harness 30 extends through an upper portion of the seat back 16 and into engagement with a conventional retractor 30C' that is mounted to an upper frame 20' that forms part of the seat back 16 at or near the top 16' of the seat back 16. Alternatively still, any one or more of the retractors 30C, 34C and/or 38C may be replaced with a conventional web-length adjuster that is positioned external to the vehicle seat 12, e.g., near the top of the vehicle seat back, and that may be manually manipulated in a conventional manner to adjust the length of the corresponding restraint harness 30, 34 and/or 38.

In the illustrated embodiment, the configurable restraint system 10 further includes a movable engagement member 50 that is mounted to the vehicle seat 12 generally, and that is generally movable relative to the vehicle seat 12. In the embodiment illustrated in FIGS. 1 and 3-6, for example, the movable engagement member 50 is movable in a direction that is generally parallel with respect to the bight 18 of the seat 12, although this disclosure contemplates that the movable engagement member 50 may alternatively be configured to be movable in one or more directions that is/are not parallel with respect to the bight 18 of the seat 12. Further in the embodiment illustrated in FIGS. 1 and 3-6, the movable engagement member 50 is movable between two operative positions relative to the vehicle seat 12. One of the operative positions is located near a center of the vehicle seat 12 which, in FIG. 1, is illustrated as being at or near a line 22 that bisects the seat bottom 14 and seat back 16 and that is perpendicular to the bight 18 of the vehicle seat 12. The other operative position is located between the center 22 of the vehicle seat 12 and the end 17 of the vehicle seat 12 as illustrated most clearly in FIG. 3. Alternatively, the other operative position may be located between the center 22 of the vehicle seat 12 and the other end 15 of the vehicle seat 12. The movable engagement member 50 includes two separate engagement members 54 and 56 that are both affixed or secured to a common mounting structure 52. The mounting structure 52, and hence the engagement members 54 and 56, are movable together between the two operative positions as described hereinabove.

In the illustrated embodiment, the configurable restraint system 10 further includes another engagement member 70, as shown in FIGS. 1 and 3-6, that is mounted to the vehicle seat 12 generally. In the illustrated embodiment, the vehicle seat 12 defines a pocket or port 12A in the seat bottom 14 that is configured to receive the engagement member 70 therein. Illustratively, the engagement member 70 is flush with, or extends below, the seating surface of the seat bottom 14 when received within the pocket or port 12A, although this disclosure contemplates other embodiments in which the engagement member 70 extends out of the pocket or port 12A when received within therein. In some embodiments, the engagement member 70 is movable relative to the vehicle seat 12 and relative to the pocket or port 12A, and in others the engagement member 70 is not movable relative to the vehicle seat 12 and relative to the pocket or port 12A. In the illustrated embodiment, the engagement member 70 is positioned generally between the movable engagement member 50 and the end 15 of the vehicle seat 12, although the engagement member 70 may alternatively be positioned generally between the movable engagement member 50 and the end 17 of the vehicle seat 12 in embodiments wherein the movable engagement member 50 is movable between one position at or near the center 22 of the vehicle seat 12 and another position between the center 22 of the vehicle seat and the other end 15 of the vehicle seat 12.

The configurable restraint system 10 is configurable to restrain one or more larger occupants in the vehicle seat 12 or to alternatively to restrain a greater number of relatively smaller occupants in the vehicle seat 12 as described hereinabove. In the embodiment illustrated in FIG. 1, for example, the configurable restraint system 10 is illustrated as being configured to restrain up to two larger occupants of a bench-style vehicle seat 12, e.g., of the type conventionally found in school buses. In this configuration, the movable engagement member 50 is moved to the position at or near the center 22 of the vehicle seat 12 so that the engagement member 32 coupled to the restraint harness 30 may releasably engage the engagement member 54 of the movable engagement member 50 to restrain one larger occupant of the vehicle seat 12, and so that the engagement member 36 coupled to the restraint harness 34 may releasably engage the engagement member 56 of the movable engagement member 50 to restrain another larger occupant of the vehicle seat 12. In this configuration, the restraint harness 38 and engagement member 70 are unused.

In the embodiment illustrated in FIG. 3, the configurable restraint system 10 is illustrated as being alternatively configured to restrain up to three relatively smaller occupants of the vehicle seat 12. In this alternate configuration, the movable engagement member 50 is moved to the position between the center 22 of the vehicle seat 12 and the end 17 of the vehicle seat so that the engagement member 40 coupled to the restraint harness 38 may releasably engage the engagement member 54 of the movable engagement member 50 to restrain one smaller occupant of the vehicle seat 12, and so that the engagement member 36 coupled to the restraint harness 34 may releasably engage the engagement member 56 of the movable engagement member 50 to restrain another smaller occupant of the vehicle seat 12. The engagement member 32 coupled to the restraint harness 30, in this configuration, may releasably engage the engagement member 70 to restrain yet another smaller occupant of the vehicle seat 12.

Figure 6A:
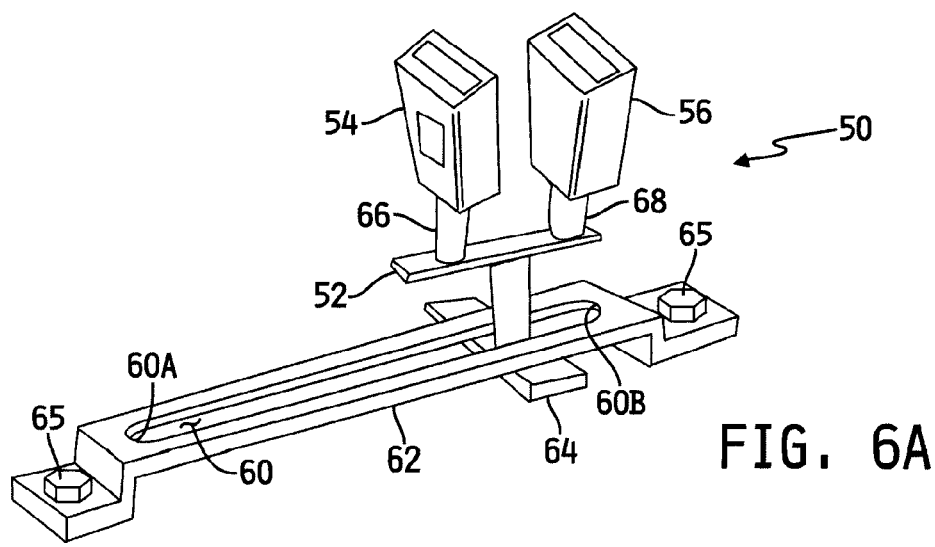
FIG. 6A is a magnified perspective view of the movable engagement member shown in FIG. 5.

Referring now to FIG. 6A, one illustrative embodiment of the movable engagement member 50 is shown. In the illustrated embodiment, a mounting member 66 extends from the engagement member 54 and is secured to the mounting structure 52 via any conventional technique. Likewise, a mounting member 68 extends from the engagement member 56 and is secured to the mounting structure 52 via any conventional technique. The mounting members 66 and 68 may be formed of any conventional flexible materials such as, for example, flexible webs, belts, straps, cables or tethers, or may alternatively be formed of any conventional rigid materials such as, for example, steel or other metal composite and/or conventional rigid plastic materials. In any case, another mounting member or protrusion 58 extending from the mounting structure 52 extends through a channel 60 formed in a base member 62. A stop member 64 is secured to the free end of the mounting member 58 so that the movable engagement member 50 is coupled to the base member 62 and to maintain the mounting member 58 within the channel 60 of the base member 62. The channel 60 defines channel ends 60A and 60B at opposite ends thereof. The mounting member 58 may be formed of any conventional flexible material such as, for example, a flexible web, belt, strap or tether, or may alternatively be formed of any conventional rigid material such as, for example, steel or other metal composite and/or one or more conventional rigid plastic materials.

In the embodiment illustrated in FIG. 6A, the channel ends 60A and 60B cooperate with the mounting member 58 to define the two operative positions of the movable engagement member 50. Specifically, the mounting member 58 is slidable or otherwise movable within the channel 60, and the position of the movable engagement member 50 that is located at or near the center 22 of the vehicle seat (e.g., see FIG. 1) corresponds to sufficient advancement of the movable engagement member 50 toward the channel end 60A so that the mounting member 58 is at or near the channel end 60A. Similarly, the position of the movable engagement member 50 that is located between the center 22 of the vehicle seat and the end 17 of the vehicle seat (e.g., see FIG. 3) corresponds to sufficient advancement of the movable engagement member 50 toward the channel end 60B so that the mounting member 58 is at or near the channel end 60B. In the illustrated embodiment, the movable engagement member 50 is movable relative to the channel 60 between the two channel ends 60A and 60B. Alternatively or additionally, the movable engagement member 50 and/or base member 62 may include a locking mechanism (not shown) that is configured to releasably secure the movable engagement member 50 to the base member 62 in either of its operative positions (e.g., near, adjacent to or against either end 60A or 60B of the channel 60).

Figure 4:
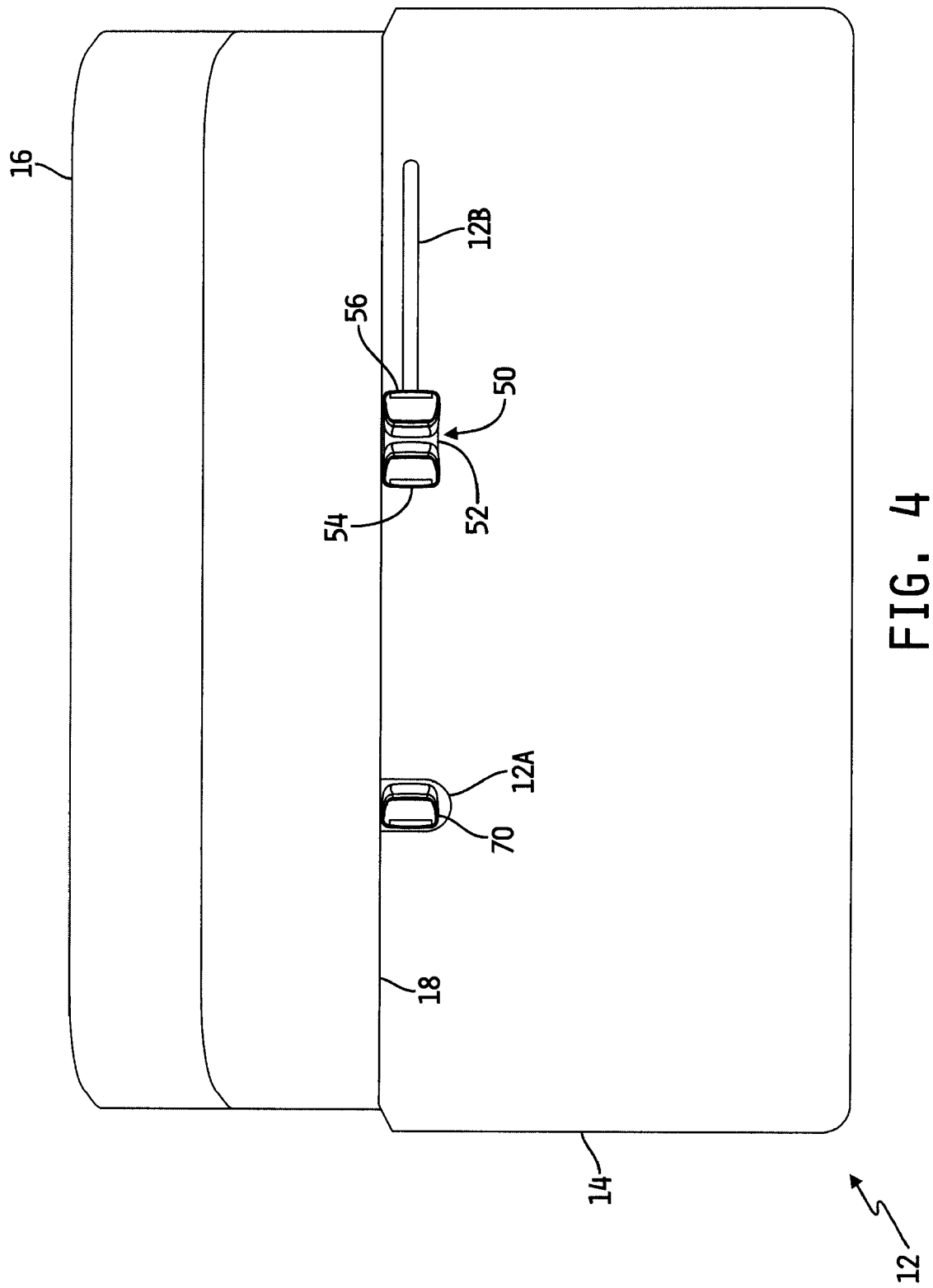
FIG. 4 is a top plan view of the vehicle seat of FIGS. 1-3 showing one illustrative position of the restraint harness engagement members relative to the vehicle seat.
Figure 5:
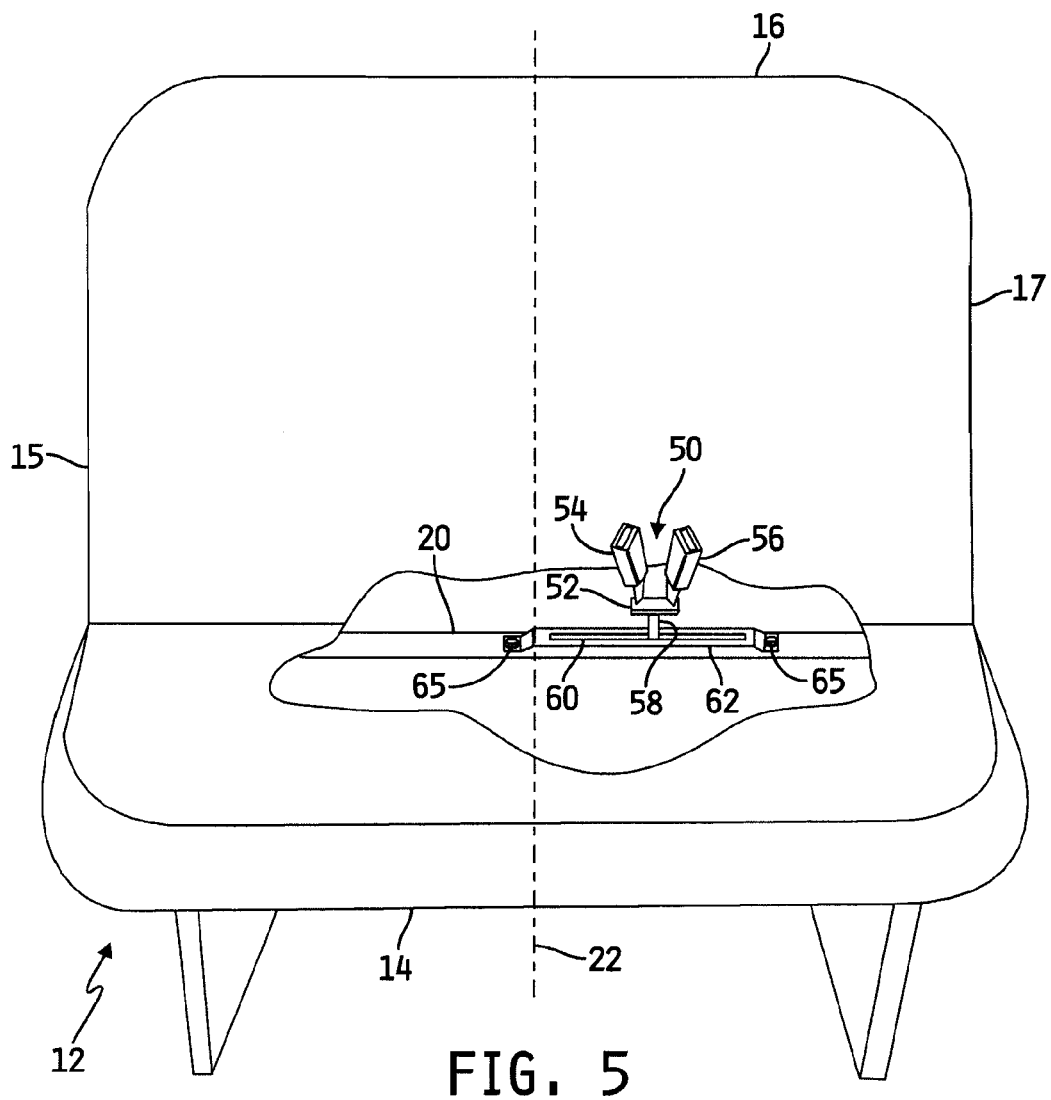
FIG. 5 is a partial cutaway view of the vehicle seat of FIGS. 1-4 showing illustrative structures for mounting the restraint harness engagement members to the vehicle seat frame.

Referring now to FIG. 5, the base member 60 of the movable engagement member 50 is illustratively shown as being secured or affixed to the frame 20 of the vehicle seat 12 via a pair of fixation members 65 (also shown in FIG. 6A). In this embodiment, the engagement members 54 and 56 extend upwardly through the bight 18 of the vehicle seat 12. Alternatively, as illustrated in FIG. 4, the seat bottom 14 of the vehicle seat 12 may define a slot or channel 12B therein or therethrough that is positioned near or adjacent to the bight 18 of the vehicle seat 12. In this embodiment, the engagement members 54 and 56 extend upwardly through the slot 12B, and are movable along the slot 12B between the two operative positions of the movable engagement member 50 as described hereinabove. The base member 62, in this embodiment, may be mounted to the frame 20 or alternatively to the seat bottom 14, and is at least partially recessed within the slot or channel 12B.

Figure 6B:
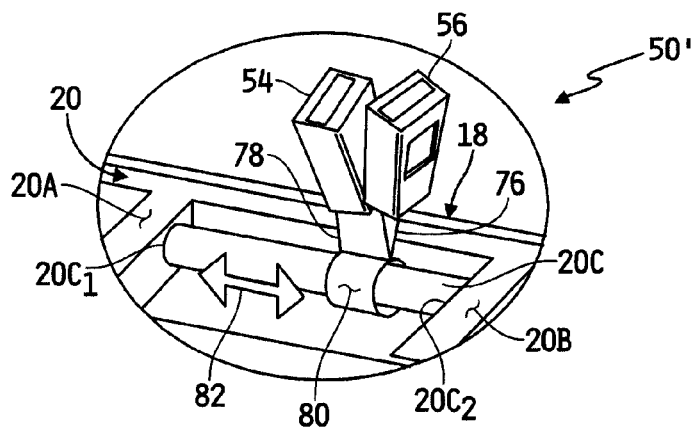
FIG. 6B is a perspective view of an alternate embodiment of the movable engagement member.

Referring now to FIG. 6B, one alternate embodiment 50' of the movable engagement member 50 of FIGS. 1-3 is shown. In the illustrated embodiment, a flexible or semi-flexible web 76 extends between the engagement member 56 and a flexible, semi-flexible or rigid mounting member 80 that is provided in the form of a loop that extends around, or at least partially around, a frame member 20C. Another flexible or semi-flexible web 78 extends between the engagement member 54 and the loop 80, and the loop 80 is slidable or otherwise movable along the frame member 20C. In the illustrated embodiment, the frame member 20C is circular in cross-section, but other cross-sectional shapes of the frame member 20C are contemplated by this disclosure. In any case, the frame member 20C extends between, and is attached at opposing ends 20C$_1$ and 20C$_2$ to, frame members 20A and 20B that are attached to, or are integral with, the seat frame 20. In the illustrated embodiment, the frame member 20C extends generally parallel with the bight 18 of the vehicle seat 12, although this disclosure contemplates other embodiments wherein the frame member 20C does not extend generally parallel with the bight 18.

In the embodiment illustrated in FIG. 6B, the ends 20C$_1$ and 20C$_2$ of the frame member 20C cooperate with the mounting member 80 to define the two operative positions of the movable engagement member 50. Specifically, the mounting member 80 is slidable or otherwise movable in directions 82 along the frame member 20C, and the position of the movable engagement member 50' that is located at or near the center 22 of the vehicle seat (e.g., see FIG. 1) corresponds to sufficient advancement of the movable engagement member 50' toward the end 20C of the frame member 20C so that the mounting member 80 is at or near the end 20C$_1$ of the frame member 20C. Similarly, the position of the movable engagement member 50' that is located between the center 22 of the vehicle seat and the end 17 of the vehicle seat (e.g., see FIG. 3) corresponds to sufficient advancement of the movable engagement member 50' toward the end 20C$_2$ of the frame member 20C so that the mounting member 80 is at or near the end 20C$_2$ of the frame member 20C. In the illustrated embodiment, the movable engagement member 50' is movable relative to the frame member 20C between the frame member ends 20C$_1$ and 20C$_2$. Alternatively or additionally, the movable engagement member 50' may include a locking mechanism (not shown) that is configured to releasably secure the movable engagement member 50' to the frame member 20C, frame 20 or other suitable structure in either of its operative positions (e.g., near, adjacent to or against either end 20C$_1$ or 20C$_2$ of the frame member 20C).

Figure 6C:
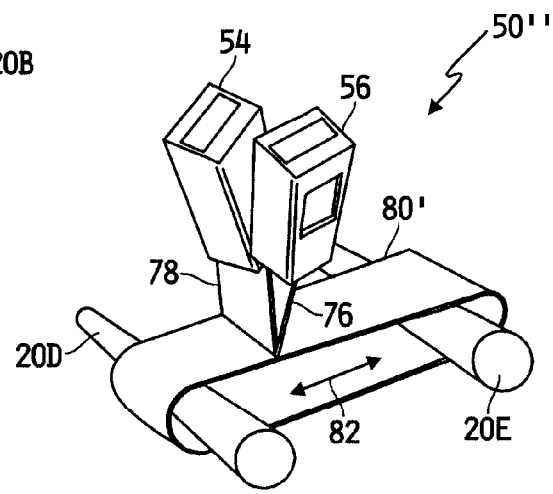
FIG. 6C is a perspective view of another alternate embodiment of the movable engagement member.

Referring now to FIG. 6C, another alternate embodiment 50" of the movable engagement member 50 of FIGS. 1-3 is shown. In the illustrated embodiment, a flexible or semi-flexible web 76 extends between the engagement member 56 and a flexible or semi-flexible mounting member 80' that is provided in the form of a loop of web, belt or strap that extends between and around a pair of generally parallel frame members 20D and 20E. Another flexible or semi-flexible web 78 extends between the engagement member 54 and the loop 80', and the loop 80' is movable in directions 82 that are generally perpendicular to the frame members 20D and 20E. In one embodiment, the frame members 20D and 20E are stationary, and the loop 80' is configured to slide or otherwise move, in the directions indicated by the bi-directional arrow 82, relative to the frame members 20D and 20E. Alternatively or additionally, the frame members 20D and 20E may be rotatable relative to the frame 20 so that the loop 80' is movable in the directions 80' via rotation of the frame members 20D and 20E or via a combination of rotation of the frame members 20D and 20E and movement of the loop 80' relative to the frame members 20D and 20E.

In the illustrated embodiment, the frame members 20D and 20E are circular in cross-section, but other cross-sectional shapes of the frame members 20D and 20E are contemplated by this disclosure. In any case, the frame members 20D and 20E are attached to or integral with the frame 20 (not shown in FIG. 6C) of the vehicle seat 12. In the illustrated embodiment, the frame members 20D and 20E extend generally perpendicular to the bight 18 of the vehicle seat 12 (not sown in FIG. 6C) so that the directions 82 of movement of the loop 80' are generally parallel with the bight 18 of the seat 12, although this disclosure contemplates other embodiments wherein the frame members 20D and 20E do not extend generally parallel with the bight 18.

In the embodiment illustrated in FIG. 6C, the frame members 20D and 20E generally define the two operative positions of the movable engagement member 50''. Specifically, the mounting member 80' is slidable or otherwise movable in the directions 82, and the position of the movable engagement member 50'' that is located at or near the center 22 of the vehicle seat (e.g., see FIG. 1) corresponds to sufficient advancement of the movable engagement member 50'' toward the frame member 20D so that the webs 76, 78 and engagement members 54, 56 are at or near the frame member 20D. Similarly, the position of the movable engagement member 50'' that is located between the center 22 of the vehicle seat and the end 17 of the vehicle seat (e.g., see FIG. 3) corresponds to sufficient advancement of the movable engagement member 50'' toward the frame member 20E so that the webs 76, 78 and engagement members 54, 56 are at or near the frame member 20E. Alternatively or additionally, the movable engagement member 50'' may include a locking mechanism (not shown) that is configured to releasably secure the movable engagement member 50'' to the frame members 20D and/or 20E, the frame 20 or other suitable structure in either of its operative positions.

Figure 6D:
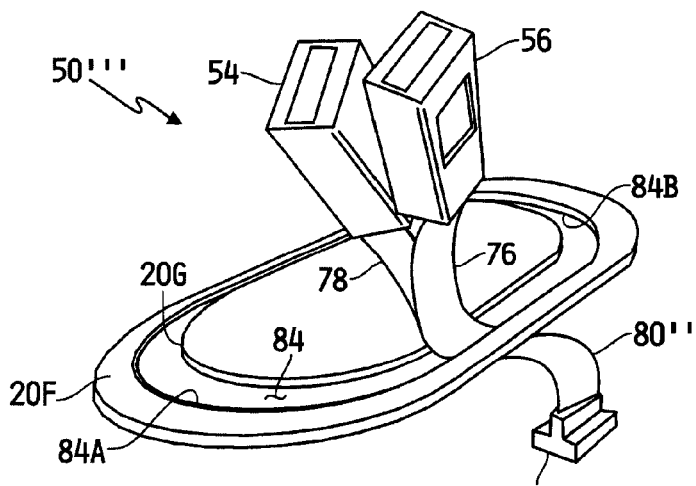
FIG. 6D is a perspective view of yet another alternate embodiment of the movable engagement member.

Referring now to FIG. 6D, yet another alternate embodiment 50''' of the movable engagement member 50 of FIGS. 1-3 is shown. In the illustrated embodiment, a flexible or semi-flexible web 76 extends between the engagement member 56 and a flexible, semi-flexible or rigid mounting member 80'' that is attached or mounted to a frame member 20H. Another flexible or semi-flexible web 78 extends between the engagement member 54 and the mounting member 80'', and in the illustrated embodiment the mounting member 80'' is provided in the form of a flexible web, strap or belt connected between the webs 76, 78 and the frame member 20H. The frame member 20H is attached to or integral with the frame 20 (not shown in FIG. 6D) of the vehicle seat 12. The movable engagement member 50''' further includes a pair of rigid or semi-rigid members 20F and 20G that are attached to or integral with the frame 20, and that define a channel or slot 84 between the two members 20F and 20G. The mounting member 80'', or alternatively just the webs 76, 78, extend through the channel or slot 84 with the engagement members 54, 56 on one side of the members 20F, 20G and the frame member 20H on the other side. Generally, the mounting member 80'', or alternatively the webs 76, 78, are movable relative to the members 20F, 20G along the channel or slot 84.

In the illustrated embodiment, the members 20F and 20G are oval in shape such that the channel or slot 84 likewise defines an oval path for movement of the mounting member 80'' and/or webs 76, 78, although other shapes of the members 20F, 20G and/or channel or slot 84 are contemplated by this disclosure. In any case, the channel or slot 84 cooperates with the mounting member 80'' and/or webs 76, 78 to define the two operative positions of the movable engagement member 50. Specifically, the mounting member 80'' and webs 76, 78 are slidable or otherwise movable along the channel or slot 84, and the position of the mounting member 80'' and/or webs 76, 78 relative to the channel or slot 84 that is closest to the center 22 of the vehicle seat (e.g., see FIG. 1) corresponds to one of the two operative positions, e.g., the position 84A relative to the channel 84. Conversely, the position of the mounting member 80'' and/or webs 76, 78 relative to the channel or slot 84 that is closest to the end 17 of the vehicle seat (e.g., see FIG. 1) corresponds to the other of the two operative positions, e.g., the position 84B relative to the channel 84. In the illustrated embodiment, the movable engagement member 50''' is movable relative to the rigid or semi-rigid members 20F and 20G to any position along the channel or slot 84 defined between the members 20F, 20G, and the two operative positions of the movable engagement member 50''' generally correspond to the channel or slot positions 84A and 84B. Alternatively or additionally, the movable engagement member 50''' may include a locking mechanism (not shown) that is configured to releasably secure the movable engagement member 50''' to the rigid or semi-rigid member 20F and/or 20G, to the frame 20, or other suitable structure in either of its operative positions (e.g., 84A and 84B).

Figure 6E:
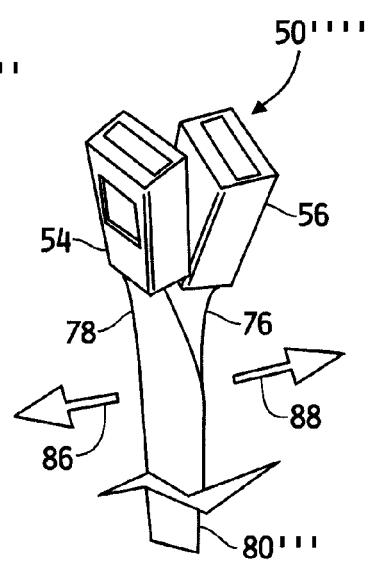
FIG. 6E is a perspective view of still another alternate embodiment of the movable engagement member.

Referring now to FIG. 6E, still another alternate embodiment 50'''' of the movable engagement member 50 of FIGS. 1-3 is shown. In the illustrated embodiment, a flexible or semi-flexible web 76 extends between the engagement member 56 and a semi-flexible, e.g., semi-rigid, mounting member 80''', and a flexible or semi-flexible web 78 likewise extends between the engagement member 54 and the mounting member 80'''. The mounting member 80''' in this embodiment is configured to be mounted to a suitable location on the frame 20 or suitable structure attached to or integral with the frame 20.

In the embodiment illustrated in FIG. 6E, the webs 76, 78 and/or mounting member 80''' is/are bendable or pivotable in the directions indicated by the arrows 86 and 88. Illustratively, the directions indicated by the arrows 86 and 88 are generally parallel with the bight 18 (not shown in FIG. 6E) of the vehicle seat 12, although this disclosure contemplates embodiments in which the directions indicated by the arrows 86 and 88 are not generally parallel with the bight 18 of the vehicle seat 12. In any case, bending or pivoting of the webs 76, 78 and/or mounting member 80''' in the directions indicated by the arrows 86 and 88 define the two operative positions of the movable engagement member 50''''. Specifically, the webs 76, 78 and/or mounting member 80''' may be bent or pivoted in the direction 86 to a position at or near the center 22 of the vehicle seat (e.g., see FIG. 1) to define one operative position of the movable engagement member 50'''', and may be bent or pivoted in the direction 88 to a position that is located between the center 22 of the vehicle seat and the end 17 of the vehicle seat (e.g., see FIG. 3) to define the other operative position of the movable engagement member 50''''. Alternatively or additionally, the movable engagement member 50''' may include a locking mechanism (not shown) that is configured to releasably secure the movable engagement member 50''''to the frame 20 or other suitable structure in either of its operative positions.

Figure 7A:
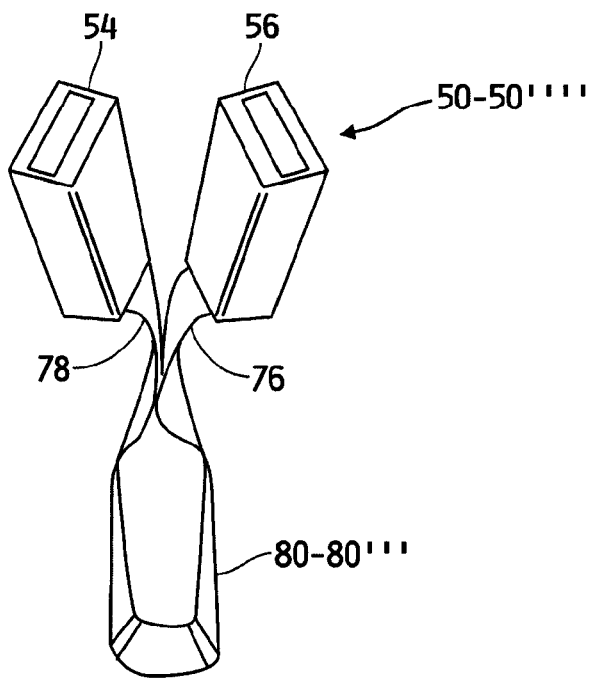
FIG. 7A is a diagram of one illustrative configuration of the engageable components of any of the movable engagement member embodiments illustrated in FIGS. 6A-6E.

Referring now to FIG. 7A, one illustrative configuration of the engageable components of any of the movable engagement member embodiments 50-50'''' of FIGS. 6A-6E is shown. In the illustrated embodiment, the engagement members 54 and 56 are attached via flexible or semi-flexible webs 78 and 76 respectively to a respective one of the mounting members 80-80'''. This mounting arrangement is illustrated, for example in the embodiments of the movable engagement member illustrated in FIGS. 6B-6E, although it should be understood that this mounting arrangement may alternatively be used with the movable engagement member embodiment illustrated in FIG. 6A.

Figure 7B:
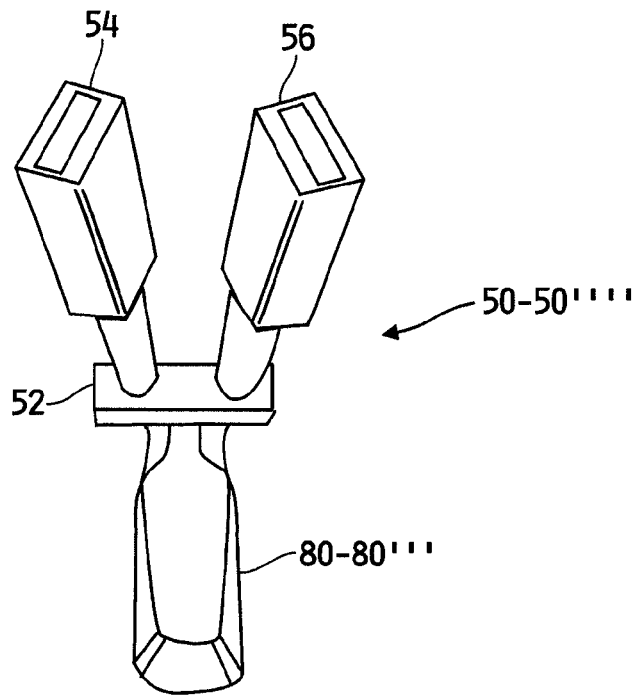
FIG. 7B is a diagram of an alternative illustrative configuration of the engageable components of any of the movable engagement member embodiments illustrated in FIGS. 6A-6E.

Referring now to FIG. 7B, another illustrative configuration of the engageable components of any of the movable engagement member embodiments 50-50'''' of FIGS. 6A-6E is shown. In the illustrated embodiment, the engagement members 54 and 56 are attached via a rigid or semi-rigid mounting structure 52, and the mounting structure 52 is attached to a respective one of the mounting members 80-80'''. Such a mounting arrangement that includes a mounting structure 52 is illustrated, for example in the embodiment of the movable engagement member 50 illustrated in FIG. 6A, although it should be understood that this mounting arrangement may alternatively be used with any one or more of the movable engagement member embodiments 50'-50'''' illustrated in FIGS. 6B-6E.

In one embodiment, the engagement members 54 and 56 of any of the movable engagement members 50-50'''' extend upwardly through the bight 18 of the vehicle seat 12 as illustrated in FIG. 5. In an alternate embodiment, the engagement members 54 and 56 of any of the movable engagement members 50-50'''' extend upwardly through a slot or channel defined in the seat bottom 14, such as the slot or channel 12B illustrated in FIG. 4.

Referring again to FIG. 3, one illustrative embodiment of the engagement member 70 is shown. In the illustrated embodiment, the engagement member 70 is affixed or secured to one end of a length of web, belt, tether, strap, cable or other flexible or semi-flexible member 72 having an opposite end (not shown) that is secured or affixed to the frame 20 of the vehicle seat 12 or other suitable structure via one or more conventional attachment members. In the illustrated embodiment, the engagement member 70 is movable relative to the vehicle seat 12 generally, and more specifically movable relative to the pocket or port 12A defined in the seat bottom 14. In this embodiment, the engagement member 70 is movable between an operative position in which the engagement member 70 may engage another complementarily configured engagement member, e.g., the engagement member 32, and a stowed position in which the engagement member 70 is received within the pocket or port 12A. Referring again to FIG. 4, an alternate embodiment of the engagement member 70 is shown. In the illustrated embodiment, the seat bottom 14 of the vehicle seat 12 defines a slot or channel 12A that is sized and configured to receive therein the engagement member 70 therein so that the engagement member is recessed within the seat bottom 14 as shown. In this embodiment, the engagement member 70 is recessed at all times within the slot or channel 12A, and is therefore generally not movable between operative and stowed positions.

Figure 8:
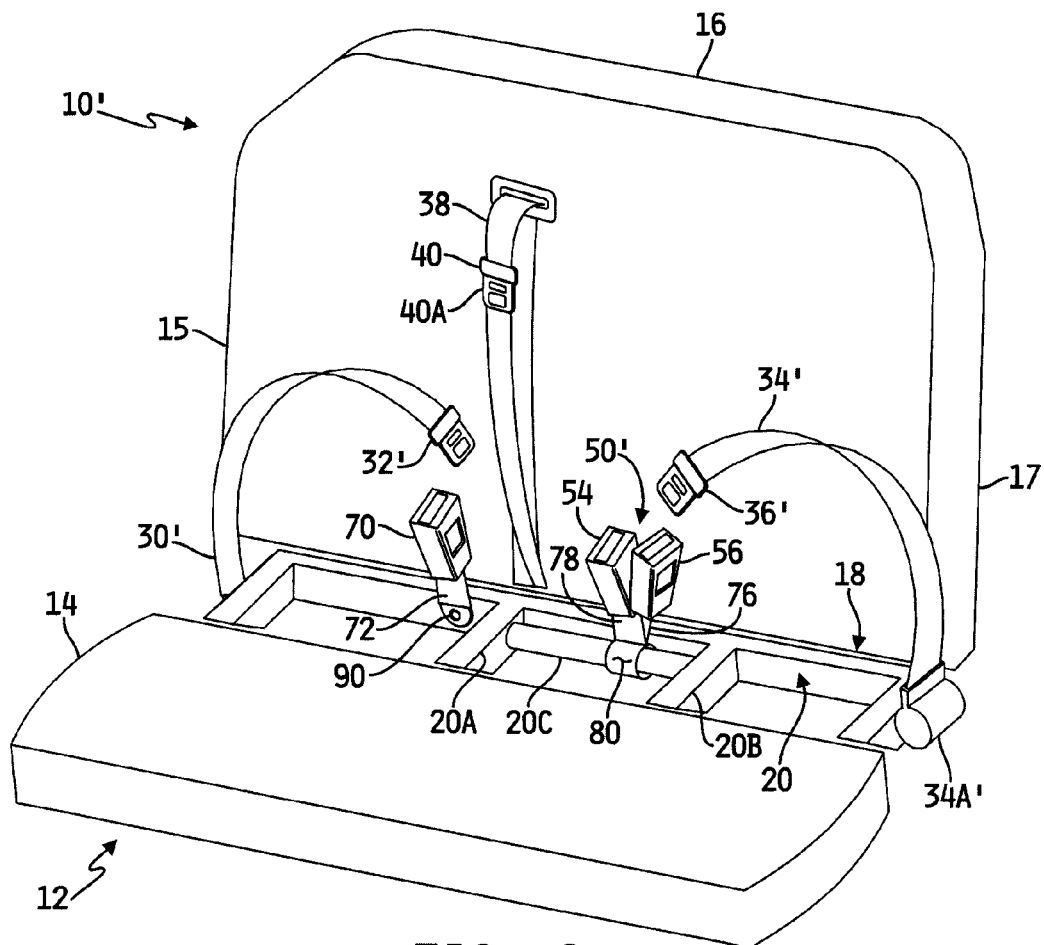
FIG. 8 is a diagram of another illustrative embodiment of a configurable restraint system for a transportation vehicle seat that is configurable to restrain up to two or three occupants of the vehicle seat.

Referring now to FIG. 8, another illustrative embodiment 10' of a configurable restraint system is shown. As with the embodiment 10 illustrated and described herein, the configurable restraint system 10' is configurable to restrain a number of relatively larger occupants of a vehicle seat 12, and is also configurable to restrain a larger number of relatively smaller occupants of the vehicle seat 12. The embodiment 10' of the configurable restraint system is identical in many respects to the configurable restraint system 10 illustrated and described herein, and like numbers are therefore used to identify like components.

In the embodiment illustrated in FIG. 8, the restraint harness 38 and engagement member 40 are unchanged relative to the embodiment 10 illustrated and described herein. The restraint harness 30 and 34, however, are replaced by so-called two-point restraint harnesses 30' and 34' respectively. More specifically, the restraint harness 30' is provided in the form of a conventional lap web or belt having one end attached to or extending from one end 15 of the seat 12, and having an opposite end attached to a conventional engagement member 32', e.g., a conventional tongue or buckle member. The restraint harness 34' is likewise provided in the form of a conventional lap web or belt having one end attached to or extending from the other end 17 of the seat 12, and having an opposite end attached to a conventional engagement member 36', e.g., a conventional tongue or buckle member. One end of the restraint harness 34' is, in this embodiment, attached to a conventional retractor 34A' that is mounted to the frame 20 of the vehicle seat 12. Corresponding ends of either of the restraint harnesses 30' and 38 may likewise be attached to a conventional retractor that may be similarly mounted to the vehicle seat frame 12. The retractors 30C, 34C and 38C may be selectively omitted or included in this embodiment such that the restraint harnesses 30', 34' and 38 may be attached at either or both of their opposite ends to a conventional retractor that is mounted to the vehicle seat frame 20.

In the illustrated embodiment, the movable engagement member is provided in the form of the movable engagement member 50' illustrated and described with respect to FIG. 6B, although it will be understood that the movable engagement member may alternatively be provided in accordance with other implementations of the movable engagement member, such as one of the movable engagement members 50 or 50''-50''' illustrated and described herein. Likewise, the engagement member 70 is provided, in the embodiment 10', in the form illustrated and described herein with respect to FIGS. 3-5. The web 72 is, in the embodiment illustrated in FIG. 8, affixed to the frame 20 of the seat via a fixation member 90. It will be understood that the engagement member 70 may alternatively be provided in accordance with other implementations, such as one of the movable implementations described herein.

Figure 9:
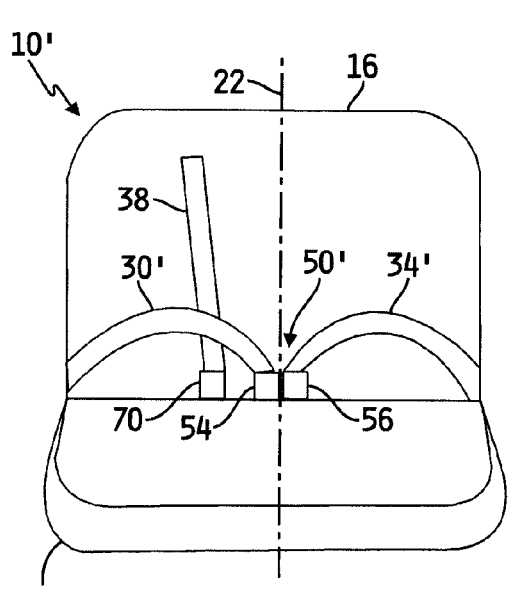
FIG. 9 is a diagram of the embodiment of FIG. 8 configured to restrain up to two relatively larger passengers of the vehicle seat.
Figure 10:
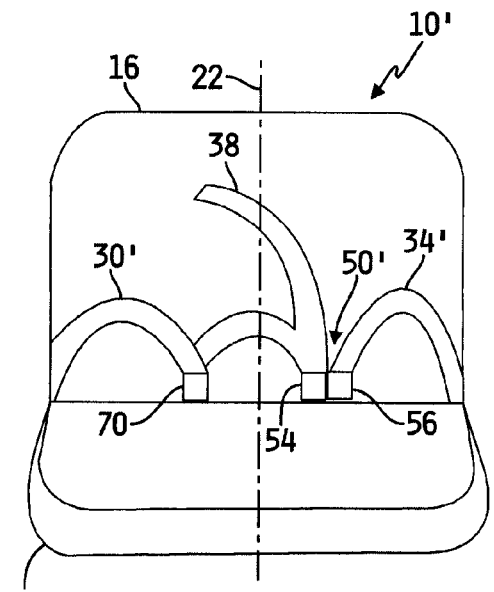
FIG. 10 is a diagram of the embodiment of FIG. 8 configured to restrain up to three relatively smaller passengers of the vehicle seat.

Referring now to FIGS. 9 and 10, operation of the configurable restraint system 10' is substantially identical to the configurable restraint system 10. Up to two relatively larger occupants, e.g., teenage or adult occupants, may be restrained by the system 10' when the movable engagement member 50' is moved to or near the center 22 of the vehicle seat 12, as illustrated in FIG. 9. When so configured, the restraint harness 38 is not used, the engagement member 32' may engage the engagement member 54 so that the restraint harness 30' restrains one relatively larger occupant of the vehicle seat 12, and the engagement member 36' may engage the engagement member 56 so that the restraint harness 34' restrains another relatively larger occupant of the vehicle seat 12. Alternatively, up to three relatively smaller occupants, e.g., toddlers, elementary, middle-school and/or junior high-school aged children, may be restrained by the system 10' when the movable engagement member 50' is moved to a position between the center 22 of the vehicle seat 12 and the end 17 of the vehicle seat 12 as illustrated in FIG. 10. When so configured, the engagement member 32' may engage the engagement member 70 so that the restraint harness 30' restrains one relatively smaller occupant of the vehicle seat 12, the engagement member 40 may engage the engagement member 54 so that the restraint harness 38 restrains another relatively smaller occupant of the vehicle seat 112, and the engagement member 36' may engage the engagement member 56 so that the restraint harness 34' restrains yet another relatively smaller occupant of the vehicle seat 12. It will be understood that the positions of the movable engagement member 50' and the engagement member 70 may be reversed so that the movable engagement member 50' is movable between a position at or near the center 22 of the vehicle seat 12 and a position between the center 22 of the seat 12 and the end 15 of the seat 12, and the engagement member 70 is positioned between the center 22 of the seat 12 and the end 17 of the seat 12.

Figure 11:
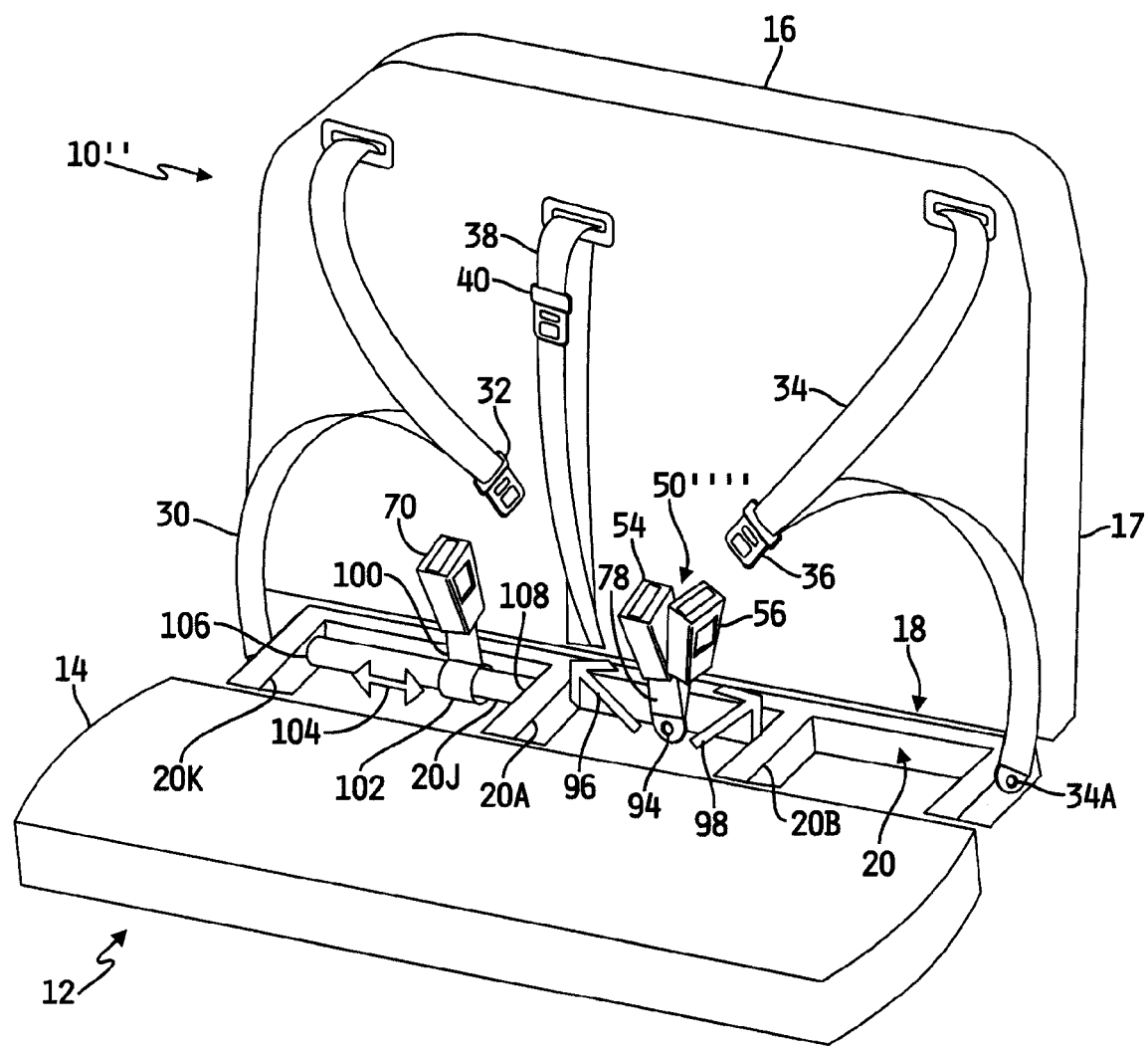
FIG. 11 is a diagram of yet another illustrative embodiment of a configurable restraint system for a transportation vehicle seat that is configurable to restrain up to two or three occupants of the vehicle seat.

Referring now to FIG. 11, yet another illustrative embodiment 10'' of a configurable restraint system is shown. As with the embodiments 10 and 10' illustrated and described herein, the configurable restraint system 10' is configurable to restrain a number of relatively larger occupants of a vehicle seat 12, and is also configurable to restrain a larger number of relatively smaller occupants of the vehicle seat 12. The embodiment 10" of the configurable restraint system is identical in many respects to the configurable restraint systems 10 and 10' illustrated and described herein, and like numbers are therefore used to identify like components.

In the embodiment illustrated in FIG. 11, the restraint harnesses 30, 34 and 38 are identical to those illustrated and described with respect to the configurable restraint system 10 except that the fixed-position webs 29, 33 and 37, as well as the height adjusters 31, 35 and 39, are omitted. Alternatively, the restraint harnesses 30, 34 and 38 may be identical to the those illustrated and described with respect to FIGS. 1, 2A and 3, either of the restraint harnesses 30 and 34 may be configured as a conventional two-point restraint harness, and/ or any of the restraint harnesses 30, 34 and 38 may be configured as conventional 4 or 5-point restraint harnesses. Modifications to the system 10' required to accommodate 4 or 5-point restraint harnesses would be a mechanical step for a skilled artisan. In the illustrated embodiment, the end 34A of the restraint harness 34 is affixed to the vehicle seat frame 20 adjacent to the end 17 of the vehicle seat 12 in a conventional manner. Either of the restraint harnesses 30 and 38 may be similarly affixed to the frame 20, or may alternatively be affixed to the frame 20 via conventional structures and techniques, or to a retractor that is affixed to the frame 20 in a conventional manner.

In any case, the movable engagement member is provided as a modification of the movable engagement member 50"" illustrated and described with respect to FIG. 6E. In the embodiment of the movable engagement member 50''' illustrated in FIG. 11, the free ends of the webs 76 and 78 are attached directly to the frame 20 via a conventional attachment member 94, rather that being attached to a mounting member 80''' as illustrated in FIG. 6E. Either one or both of the engagement members 54, 56 may be pivoted or otherwise moved in either direction 96 or 98 to position either or both of the engagement members 54, 56.

In the embodiment illustrated in FIG. 11, the engagement member 70 is provided in the form of a movable engagement member similar to the movable engagement member 50' illustrated and described with respect to FIG. 6B. More specifically, the engagement member 70 is connected via a flexible or semi-flexible web 100 to a flexible, semi-flexible or rigid mounting member 102 that is provided in the form of a loop that extends around, or at least partially around, a frame member 20J, and the loop 80 is slidable or otherwise movable along the frame member 20J. In the illustrated embodiment, the frame member 20J is circular in cross-section, but other cross-sectional shapes of the frame member 20J are contemplated by this disclosure. In any case, the frame member 20J extends between, and is attached at opposing ends 106 and 108, to frame members 20K and 20A respectively that are attached to, or are integral with, the seat frame 20. In the illustrated embodiment, the frame member 20J extends generally parallel with the bight 18 of the vehicle seat 12, although this disclosure contemplates other embodiments wherein the frame member 20J does not extend generally parallel with the bight 18.

In the embodiment illustrated in FIG. 11, the mounting member 102 is slidable or otherwise movable in directions 104 along the frame member 20J to any position between the positions 106 and 108. Alternatively or additionally, the movable engagement member 70 may include a locking mechanism (not shown) that is configured to releasably secure the movable engagement member 70 to the frame member 20J, frame 20 or other suitable structure in any operative position between the positions 106 and 108. Alternatively still, the engagement member 70 may be provided in accordance with other movable implementations, such as one similar to any of the movable engagement member embodiments illustrated and described with respect to FIGS. 6A-6E.

In the various embodiments illustrated herein, the engagement members 32, 32', 36, 36' and 40 comprise conventional tongue members, and the engagement members 54, 56 and 70 comprise conventional buckle members. In this embodiment, the various buckle members are configured to releasably engage corresponding ones of the tongue members in a conventional manner. Illustratively, each of the tongue members 32, 32', 36, 36' and 40 may be configured identically and each of the buckle members 54, 56 and 70 may likewise be configured identically so that any of the buckle members 54, 56 and 70 may releasably engage any of the tongue members 32, 32', 36, 36' and 40. Alternatively, certain ones of the tongue and buckle members may be configured so that such buckle members may releasably engage only correspondingly configured tongue members. In one specific embodiment, for example, the tongue members 32 and 40 may be configured identically, and the buckle members 54 and 70 may be configured identically so that the buckle member 54 may releasably engage either of the tongue members 32 (or 32') and 40 as illustrated in FIGS. 1 and 3. In this specific embodiment, the tongue member 36 (or 36') and buckle member 56 may be configured differently than the tongue members 32 (or 32') and 40 and the buckle members 54 and 70, so that the buckle member 56 may only releasably engage the tongue member 36 (or 36') and will not releasably engage either of the tongue members 32 (or 32') or 40. In any case, those skilled in the art will recognize that any one or more of the engagement members 32, 32', 36, 36' and 40 may alternatively be provided in the form a conventional buckle member, and that any one or more of the engagement members 54, 56 and 70 may alternatively be provided in the form of a conventional tongue member.

Figure 12:
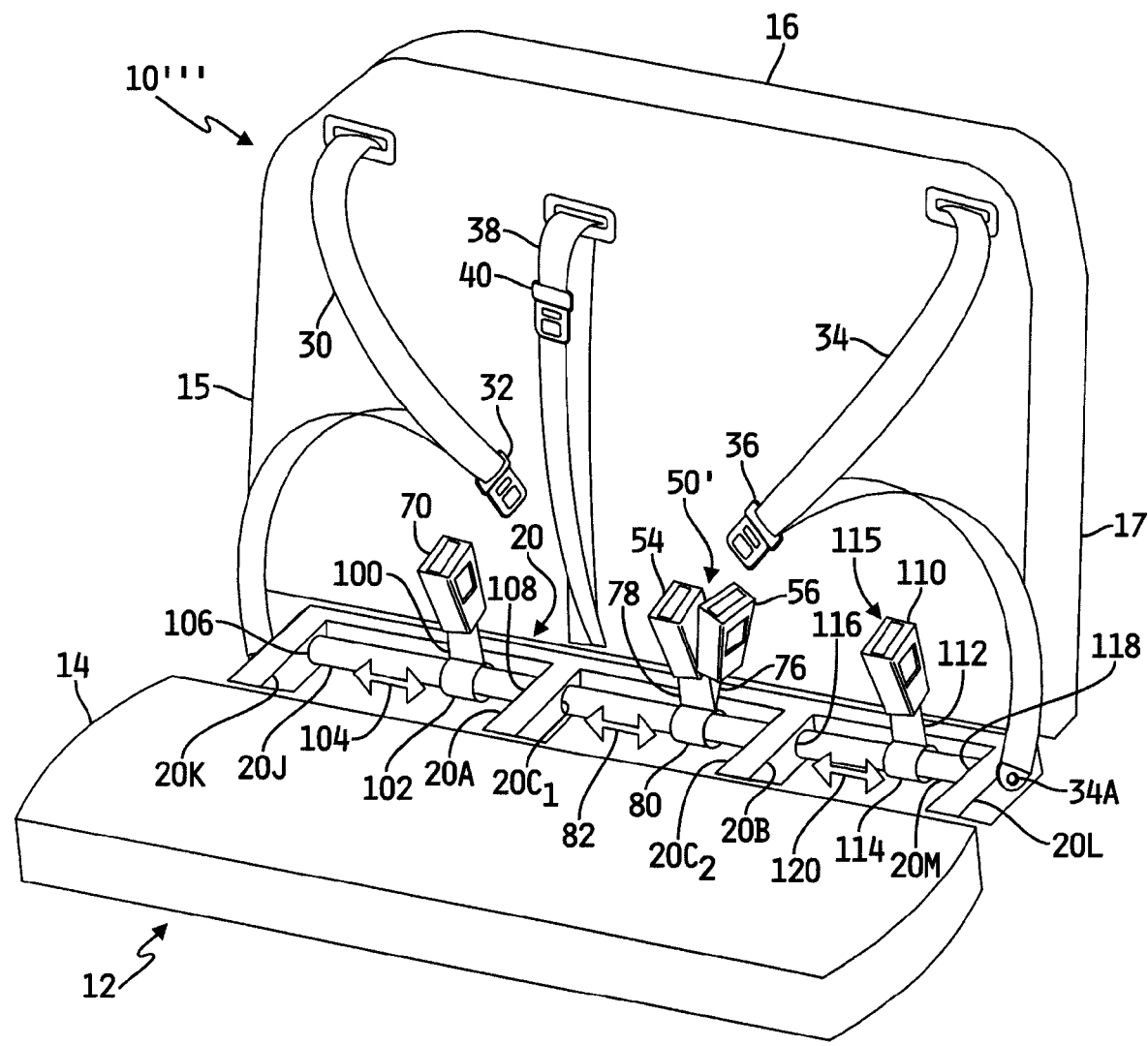
FIG. 12 is a diagram of still another illustrative embodiment of a configurable restraint system for a transportation vehicle seat that is configurable to restrain up to two or three occupants of the vehicle seat.

Referring now to FIG. 12, still another illustrative embodiment 10''' of a configurable restraint system is shown. As with the embodiments 10, 10' and 10" illustrated and described herein, the configurable restraint system 10''' is configurable to restrain a number of relatively larger occupants of a vehicle seat 12, and is also configurable to restrain a larger number of relatively smaller occupants of the vehicle seat 12. The embodiment 10''' of the configurable restraint system is identical in many respects to the configurable restraint systems 10, 10' and 10" illustrated and described herein, and like numbers are therefore used to identify like components.

In the embodiment illustrated in FIG. 12, the restraint harnesses 30, 34 and 38 are identical to those illustrated and described with respect to the configurable restraint system 10" of FIG. 11. Alternatively, the restraint harnesses 30, 34 and 38 may be identical to those illustrated and described with respect to FIGS. 1, 2A and 3, either of the restraint harnesses 30 and 34 may be configured as a conventional two-point restraint harness, and/or any of the restraint harnesses 30, 34 and 38 may be configured as conventional 4 or 5-point restraint harnesses. Modifications to the system 10" required to accommodate 4 or 5-point restraint harnesses would be a mechanical step for a skilled artisan. The movable engagement member is provided in the form of the movable engagement member 50' illustrated and described with respect to FIG. 6B, although it will be understood that the movable engagement member may alternatively be provided in accordance with other implementations of the movable engagement member, such as one of the movable engagement members 50 or 50"-50''' illustrated and described herein. Likewise, the engagement member 70 is provided, in the illustrated embodiment 10''', in the form of the movable engagement member 70 illustrated and described herein with respect to FIG. 11, although it will be understood that the engagement member 70 may alternatively be provided in accordance with other movable implementations, such as one similar to any of the movable engagement member embodiments illustrated and described with respect to FIGS. 6A-6E.

The embodiment 10''' of FIG. 12 further includes an additional movable engagement member 115 that is similar to the movable engagement member 50' and that is provided between the movable engagement member 50' and the end 17 of the vehicle seat 12. More specifically, the movable engagement member 115 includes an engagement member 110 connected via a flexible or semi-flexible web 112 to a flexible, semi-flexible or rigid mounting member 114 that is provided in the form of a loop that extends around, or at least partially around, a frame member 20M, and the loop 114 is slidable or otherwise movable along the frame member 20M. In the illustrated embodiment, the frame member 20M is circular in cross-section, but other cross-sectional shapes of the frame member 20M are contemplated by this disclosure. In any case, the frame member 20M extends between, and is attached at opposing ends 116 and 118, to frame members 20B and 20L respectively that are attached to, or are integral with, the seat frame 20. In the illustrated embodiment, the frame member 20M extends generally parallel with the bight 18 of the vehicle seat 12, although this disclosure contemplates other embodiments wherein the frame member 20M does not extend generally parallel with the bight 18.

In the embodiment illustrated in FIG. 12, the mounting member 114 is slidable or otherwise movable in directions 120 along the frame member 20M to any position between the positions 116 and 118. Alternatively or additionally, the movable engagement member 115 may include a locking mechanism (not shown) that is configured to releasably secure the movable engagement member 115 to the frame member 20M, frame 20 or other suitable structure in any operative position between the positions 116 and 118.

In the system 10''', the tongue members 32, 36 and 38 and buckle members 54, 56, 70 and 110 are configured so that such buckle members may releasably engage only specific and correspondingly configured tongue members. In one specific embodiment, for example, the tongue members 32 and 36 may be configured identically and such that these tongue members may engage any of the buckle members 54, 56, 70 and 110, and the tongue member 40 may be configured such that it may only engage the buckle member 56. With this configuration, the spaces between adjacent ones of the engagement members 70, 50' and 115 relative to the sea bottom 14 may be widely variable to accommodate different sizes of the relatively larger and/or relatively smaller occupants of the vehicle seat 12. In any case, those skilled in the art will recognize that any one or more of the engagement members 32, 36, and 40 may alternatively be provided in the form a conventional buckle member, and that any one or more of the engagement members 54, 56, 70 and 110 may alternatively be provided in the form of a conventional tongue member.

Figure 13:
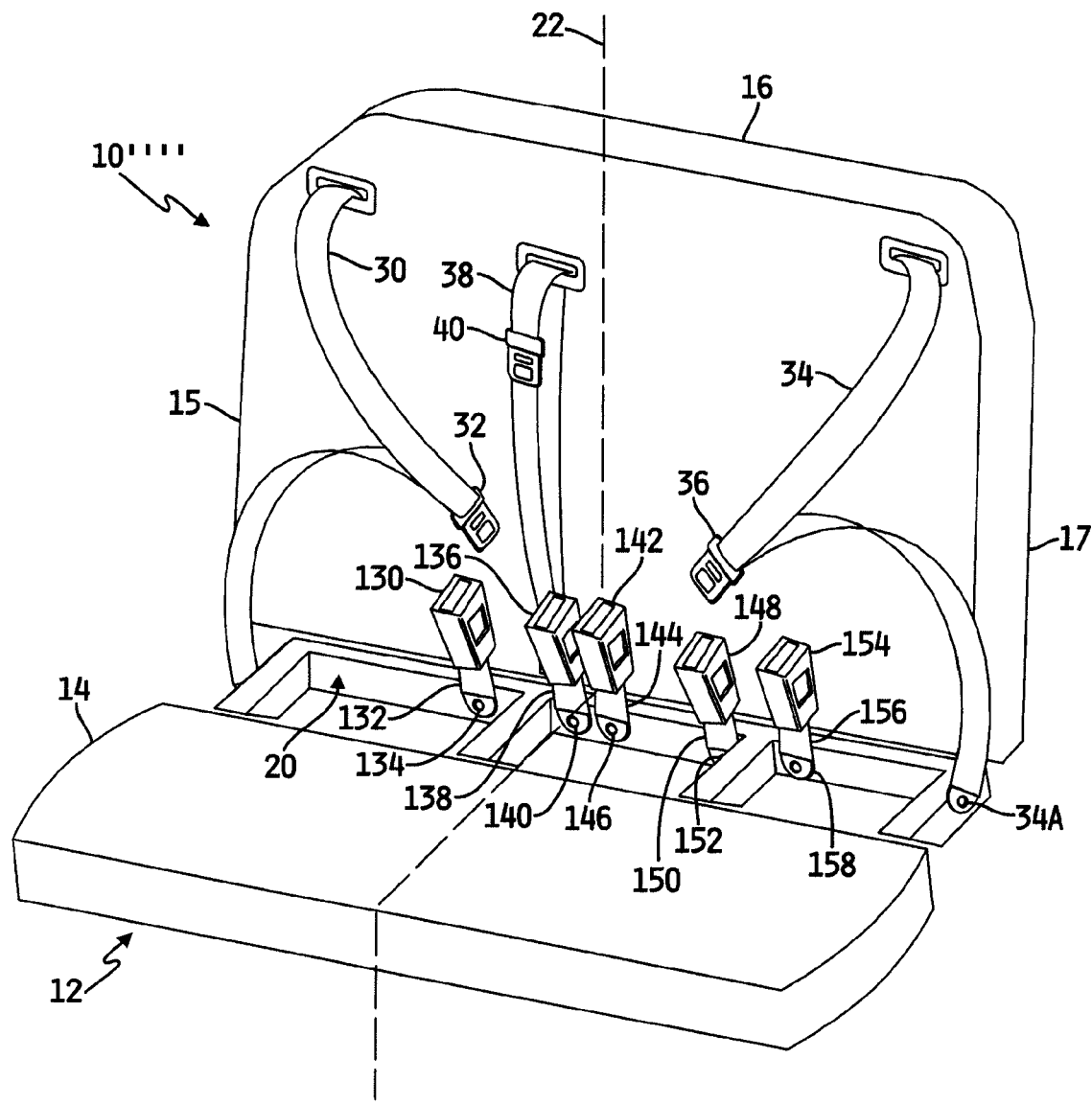
FIG. 13 is a diagram of a further illustrative embodiment of a configurable restraint system for a transportation vehicle seat that is configurable to restrain up to two or three occupants of the vehicle seat.

Referring now to FIG. 13, a further illustrative embodiment 10'''' of a configurable restraint system is shown. As with the embodiments 10, 10', 10'' and 10''' illustrated and described herein, the configurable restraint system 10'''' is configurable to restrain a number of relatively larger occupants of a vehicle seat 12, and is also configurable to restrain a larger number of relatively smaller occupants of the vehicle seat 12. The embodiment 10'''' of the configurable restraint system is identical in some respects to the configurable restraint systems 10, 10', 10'' and 10''' illustrated and described herein, and like numbers are therefore used to identify like components.

In the embodiment illustrated in FIG. 13, the restraint harnesses 30, 34 and 38 are identical to those illustrated and described with respect to the configurable restraint system 10'' of FIG. 11. Alternatively, the restraint harnesses 30, 34 and 38 may be identical to those illustrated and described with respect to the configurable restraint system 10 (FIGS. 1, 2A and 3), either of the restraint harnesses 30 and 34 may be configured as a conventional two-point restraint harness, and/or any of the restraint harnesses 30, 34 and 38 may be configured as conventional 4 or 5-point restraint harnesses. Modifications to the system 10''''required to accommodate 4 or 5-point restraint harnesses would be a mechanical step for a skilled artisan. In any case, the system 10'''' does not include any movable engagement members, such as any of the movable engagement members 50-50'''' or the movable engagement members 70 of FIGS. 11 and 12 or 115 of FIG. 12. Rather, the system 10'''' includes a number of stationary engagement members that are configured to engage only specific ones of the engagement members 32, 36 and 40.

In the embodiment illustrated in FIG. 13, an engagement member 136 is attached via a flexible or semi-flexible web 138 to the frame 20 via a conventional attachment member 140, and another engagement member 142 is attached via a flexible or semi-flexible web 144 to the frame 20 via another conventional attachment member 146 adjacent to the engagement member 136, wherein the center 22 of the vehicle seat 12 bisects the two engagement members 136 and 142. Yet another engagement member 130 is attached via a flexible or semi-flexible web 132 to the frame 20 via another conventional attachment member 134 such that the engagement member 130 is positioned between the center 22 of the vehicle seat 12 and the end 15 of the vehicle seat. Still another engagement member 148 is attached via a flexible or semi-flexible web 150 to the frame 20 via another conventional attachment member 154 such that the engagement member 148 is positioned between the center 22 of the vehicle seat 12 and the end 17 of the vehicle seat, and a further engagement member 154 is attached via a flexible or semi-flexible web 156 to the frame 20 via another conventional attachment member 158 such that the engagement member 154 is positioned between the engagement member 148 and the end 17 of the vehicle seat 12.

In the system 10'''', the tongue members 32, 36 and 38 and buckle members 130, 136, 142, 148 and 154 are configured so that such buckle members may releasably engage only specific and correspondingly configured tongue members. In one specific embodiment, for example, the tongue members 32 and 36 may be configured identically and such that these tongue members may engage only the buckle members 130, 136, 142 and 154, and the tongue member 40 may be configured such that it may only engage the buckle member 148. Those skilled in the art will recognize that any one or more of the engagement members 32, 36, and 40 may alternatively be provided in the form a conventional buckle member, and that any one or more of the engagement members 130, 136, 142, 148 and 154 may alternatively be provided in the form of a conventional tongue member.

The system 10'''' illustrated in FIG. 13 may be configured to restrain up to two relatively larger occupants, e.g., teenage or adult occupants. In this configuration, the restraint harness 30 may restrain one relatively larger occupant of the seat 12 when the engagement member 32 engages the engagement member 136, and the restraint harness 34 may restrain another relatively larger occupant of the vehicle seat when the engagement member 36 engages the engagement member 142. In this configuration, the restraint harness 38 is not used. The system 10'''' illustrated in FIG. 13 may also be configured to restrain up to three relatively smaller occupants, e.g., toddlers, elementary, middle-school and/or junior high-school aged children. In this configuration, the restraint harness 30 may restrain one relatively smaller occupant of the seat 12 when the engagement member 32 engages the engagement member 130, the restraint harness 38 may restrain another relatively smaller occupant of the seat 12 when the engagement member 40 engages the engagement member 148, and the restraint harness 34 may restrain yet another relatively smaller occupant of the vehicle seat 12 when the engagement member 36 engages the engagement member 154.

Figure 14:
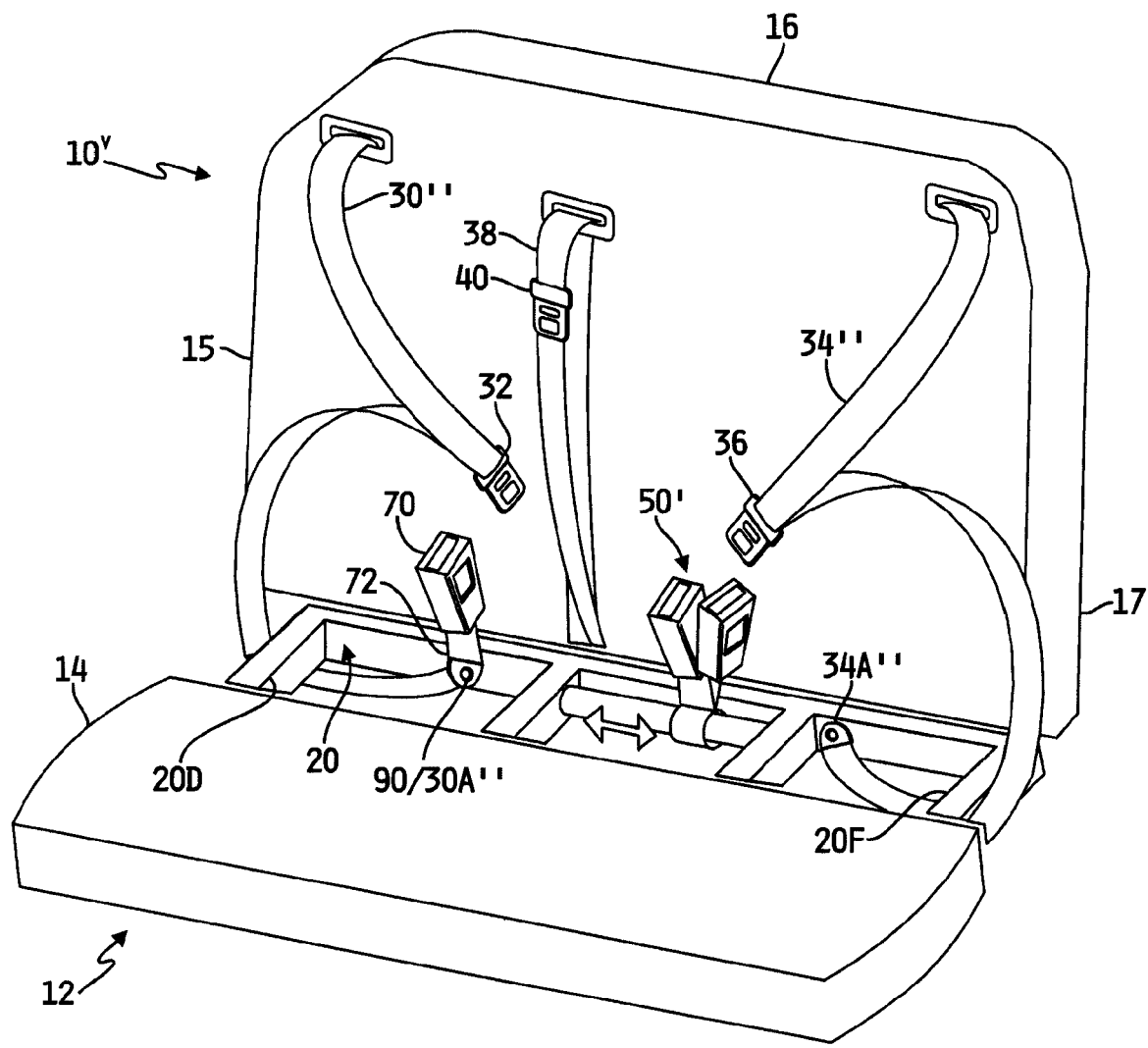
FIG. 14 is a diagram of a configurable restraint system for a transportation vehicle seat illustrating alternate attachment points of the outside restraint harnesses to the seat frame.

Referring now to FIG. 14, still another illustrative embodiment 10$^V$ of a configurable restraint system is shown. As with the embodiments 10, 10', 10'', 10''' and 10'''' illustrated and described herein, the configurable restraint system 10$^V$ is configurable to restrain a number of relatively larger occupants of a vehicle seat 12, and is also configurable to restrain a larger number of relatively smaller occupants of the vehicle seat 12. The embodiment 10'''' of the configurable restraint system is identical in some respects to the configurable restraint systems 10, 10', 10'', 10''' and 10'''' illustrated and described herein, and like numbers are therefore used to identify like components.

In the embodiment illustrated in FIG. 14, the restraint harnesses 30'' and 34'' differ from the restraint harnesses 30 and 34 illustrated and described herein in that they are not attached to the frame 20 or seat bottom 14 at or near the corresponding ends 15 and 17 respectively of the vehicle seat 12, but are instead attached to the frame 20 at attachment points 30A'' and 34A'' remote from the ends 15 and 17 of the vehicle seat 12. Thus, for purposes of this document, the term "extending from an end of the vehicle seat" is defined to include attached to, adjacent to or near an end of the vehicle seat 12, and attached to the vehicle seat at a location remote from the end of the vehicle seat but in contact with, and extending from, the end or near the end of the vehicle seat 12.

It will be understood that the restraint harnesses 30, 34 and 38 may alternatively be identical to those illustrated and described with respect to the configurable restraint system 10 (FIGS. 1, 2A and 3), either of the restraint harnesses 30'' and 34'' may alternatively be configured as a conventional two-point restraint harness, and/or any of the restraint harnesses 30'', 34'' and 38 may be configured as conventional 4 or 5-point restraint harnesses. Modifications to the system 10$^V$ required to accommodate 4 or 5-point restraint harnesses would be a mechanical step for a skilled artisan. It will be further understood that while the movable engagement member is provided in the system 10$^V$ in the form of the movable engagement member 50' illustrated and described herein, and the engagement member 70 is provided in a non-movable form as illustrated and described herein, such engagement members may alternatively be provided in any movable or non-movable form using any of the configurations illustrated and described herein with respect to FIGS. 1-13.

Figure 15:
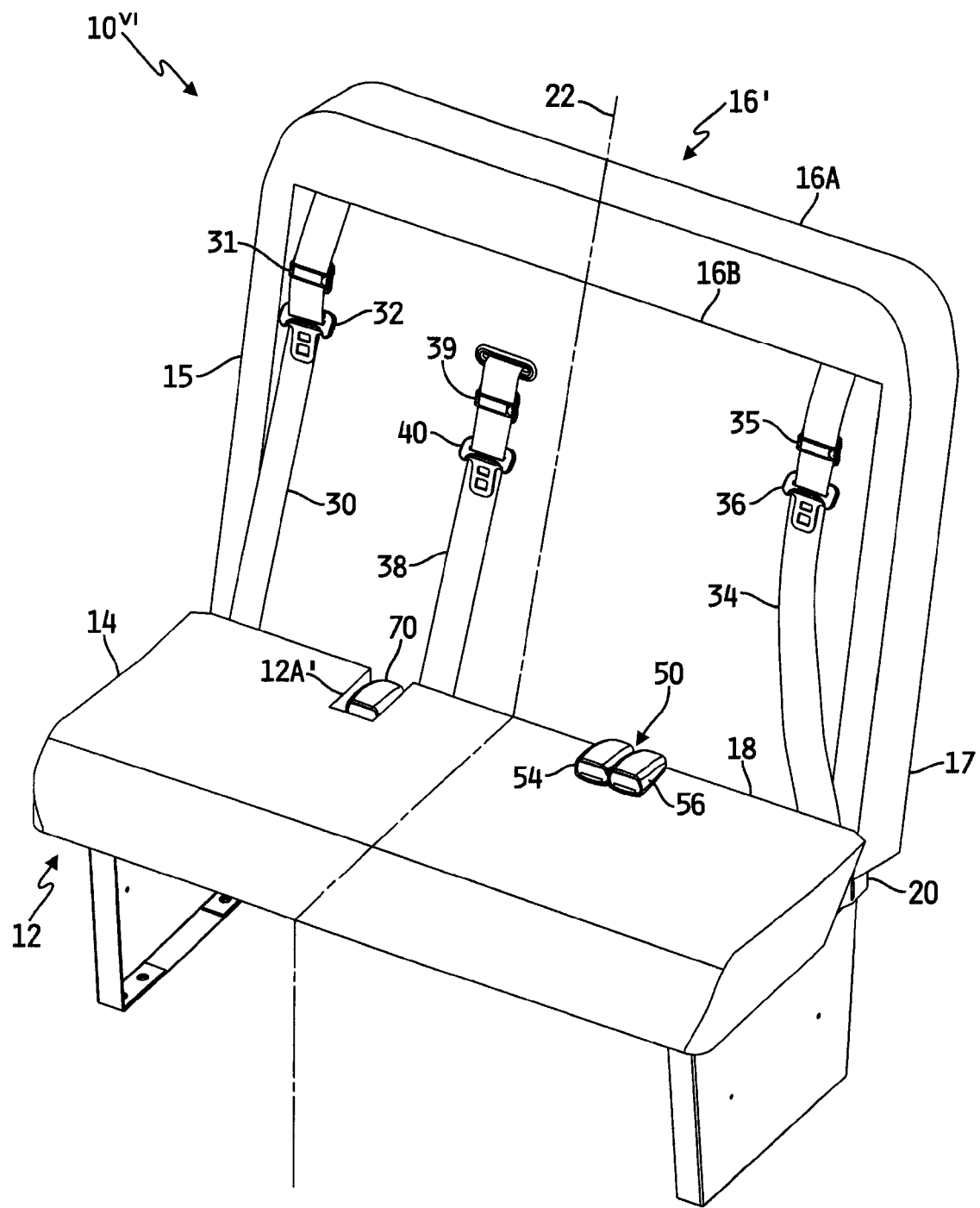
FIG. 15 is a diagram of still a further illustrative embodiment of a configurable restraint system for a transportation vehicle seat that is configurable to restrain up to two or three occupants of the vehicle seat.
Figure 16:
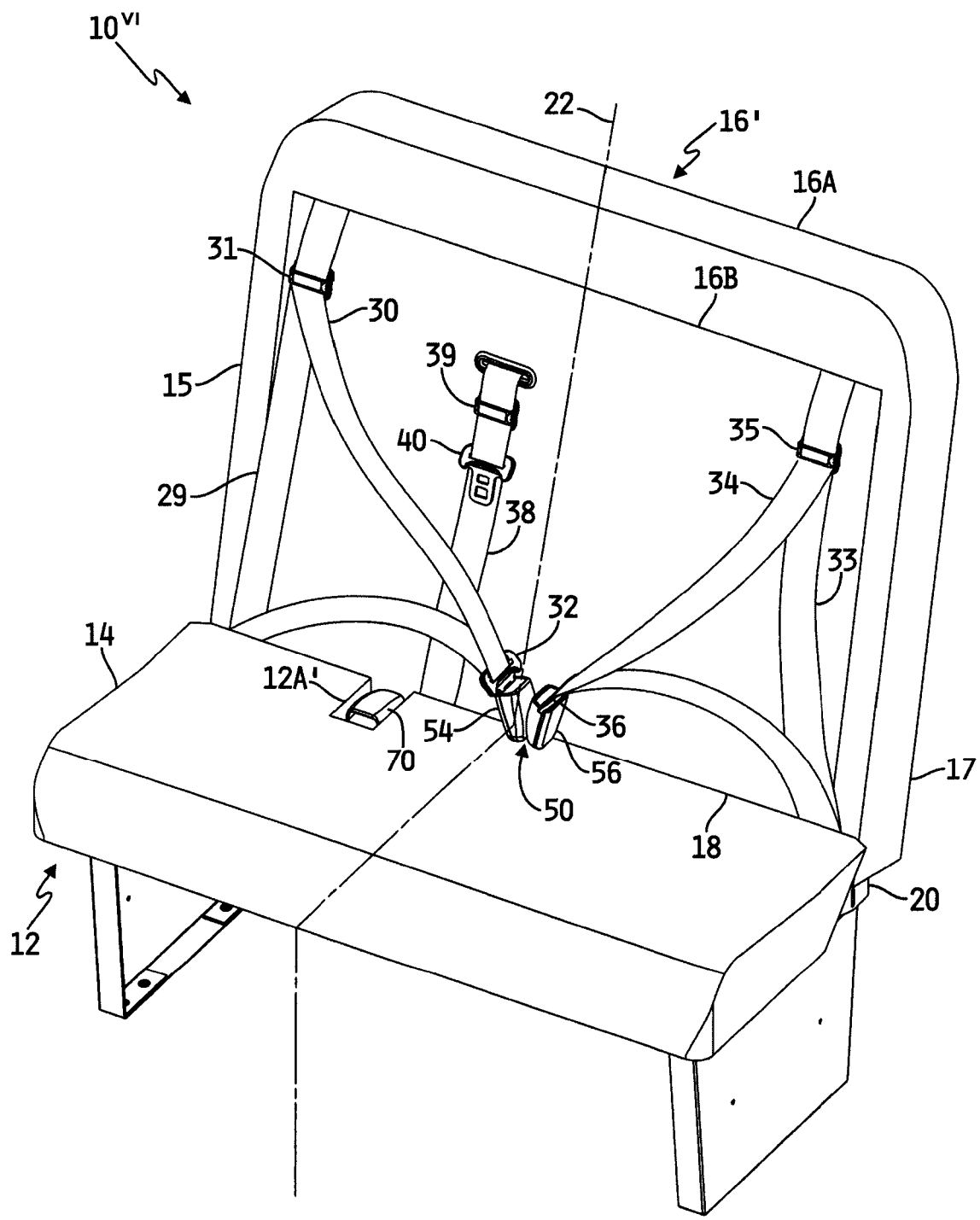
FIG. 16 is a diagram of the embodiment of FIG. 15 configured to restrain up to two relatively larger occupants of the vehicle seat.
Figure 17:
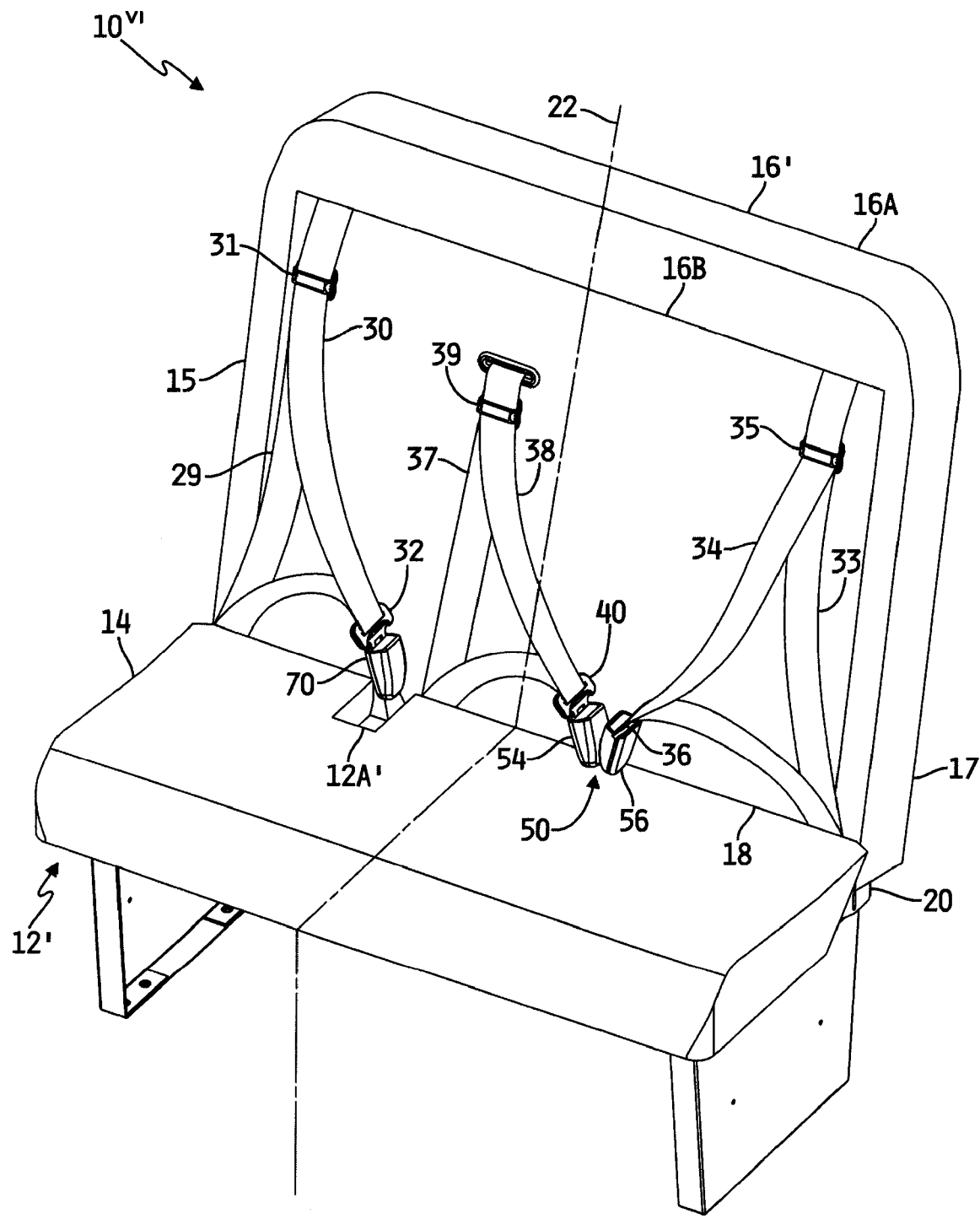
FIG. 17 is a diagram of the embodiment of FIG. 15 configured to restrain up to three relatively smaller passengers of the vehicle seat.

Referring now to FIGS. 15-17, still a further illustrative embodiment 10$^{VI}$ of a configurable restraint system is shown. In the illustrated embodiment, the vehicle seat 12' is provided in the form of a vehicle seat of the type illustrated and described in U.S. Pat. Nos. 6,123,388, 6,485,098, 6,508,515, 6,886,889, 7,029,067, 7,040,696 and 7,144,085, which are assigned to the assignee of this disclosure, and the disclosures of which are all incorporated herein by reference. Generally, the seat 12' has a seat bottom 14 and a seat back 16' that are both mounted to a frame 20. The seat back 16' includes an outer seat back portion 16A that is configured to receive an inner back portion 16B. The outer back portion 16A is configured to be stationary relative to the frame 20, and the inner back portion 16B is configured to move, e.g., pivot, forwardly with respect to the frame 20 and with respect to the outer back portion 16A. Under vehicle crash conditions of sufficient severity, the inner seat back portion 16B is configured to move, e.g., pivot, away from the outer back portion 16A to a predefined position relative to the outer back portion 16A.

In the embodiment illustrated in FIGS. 15-17, the restraint harnesses 30, 34 and 38 are identical to those illustrated and described hereinabove with respect to the configurable restraint system 10 of FIGS. 1, 2A and 3, although the restraint harnesses 30, 34 and 38 may alternatively be identical to those illustrated and described hereinabove with respect to the configurable restraint system 10'''' of FIG. 11. It will be understood that either of the restraint harnesses 30'' and 34'' may otherwise be configured as a conventional two-point restraint harness, and/or any of the restraint harnesses 30''', 34''' and 38 may be configured as conventional 4 or 5-point restraint harnesses. Modifications to the system 10$^{VI}$ required to accommodate 4 or 5-point restraint harnesses would be a mechanical step for a skilled artisan.

As with the embodiments 10, 10', 10'', 10''' and 10$^V$ illustrated and described herein, the configurable restraint system 10$^{VI}$ is configurable to restrain a number of relatively larger occupants of a vehicle seat 12, and is also configurable to restrain a larger number of relatively smaller occupants of the vehicle seat 12'. The embodiment 10$^{VI}$ of the configurable restraint system is identical in some respects to the configurable restraint systems 10, 10', 10'', 10''', 10'''' and 10$^V$ illustrated and described herein, and like numbers are therefore used to identify like components.

The configurable restraint system 10$^{VI}$ includes a movable engagement member, designated generally at 50, and another engagement member 70 that may or may not be movable. It will be understood that while the movable engagement member is provided in the system 10$^{VI}$ in the form of the movable engagement member 50 illustrated and described herein, and the engagement member 70 is provided in a movable form as illustrated and described herein, such engagement members may alternatively be provided in any movable or non-movable form using any of the configurations illustrated and described herein with respect to FIGS. 1-13.

The system 10$^{VI}$ illustrated in FIGS. 15-17 may be configured to restrain up to two relatively larger occupants, e.g., teenage or adult occupants by moving the movable engagement member 50 toward the center 22 of the vehicle seat 12. In this configuration, as specifically illustrated in FIG. 16, the restraint harness 30''' may restrain one relatively larger occupant of the seat 12 when the engagement member 32 engages the engagement member 54, and the restraint harness 34''' may restrain another relatively larger occupant of the vehicle seat when the engagement member 36 engages the engagement member 56. In this configuration, the restraint harness 38 and the engagement member 70 are not used. The system 10$^{VI}$ may also be configured to restrain up to three relatively smaller occupants, e.g., toddlers, elementary, middle-school and/or junior high-school aged children by moving the movable engagement member 50 toward the end 17 of the vehicle seat 12'. In this configuration, as specifically illustrated in FIG. 17, the restraint harness 30''' may restrain one relatively smaller occupant of the seat 12 when the engagement member 32 engages the engagement member 70, the restraint harness 38 may restrain another relatively smaller occupant of the seat 12 when the engagement member 40 engages the engagement member 54, and the restraint harness 34''' may restrain yet another relatively smaller occupant of the vehicle seat 12 when the engagement member 36 engages the engagement member 56.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the embodiment of the configurable restraint systems 10, 10', 10'', 10''', 10'''', 10$^V$ and 10$^{VI}$ are illustrated and described herein in the context of a vehicle seat 12 or 12' that is sized and configured to accommodate two larger occupants or three relatively smaller occupants, any one or more of the configurable restraint harness systems 10, 10', 10'', 10''', 10'''', 10$^V$ and 10$^{VI}$ may alternatively be configured for use with vehicle seats allowing for more or fewer larger occupants and/or relatively smaller occupants simply by adding or eliminating one or more restraint harnesses, movable or non-movable engagement members similar to one or more of the movable engagement members 50-50'''' and/or one or more movable or non-movable engagement members similar to the engagement member 70.

What is claimed is:

1. A configurable restraint system for a vehicle seat, the vehicle seat having frame and a seat back and seat bottom mounted to the frame, the restraint system comprising:
a first restraint harness mounted to the vehicle seat and coupled to a first engagement member,
a second restraint harness mounted to the vehicle seat and coupled to a second engagement member, and
a third engagement member mounted on and to the frame and configured to be movable between first and second positions relative to the vehicle seat, the first position being located relative to the vehicle seat so that the first engagement member may releasably engage the third engagement member to restrain a first occupant of the vehicle seat via the first restraint harness, and the second position being located relative to the vehicle seat so that the second engagement member may alternatively releasably engage the third engagement member to alternatively restrain the first occupant of the vehicle seat via the second restraint harness.

2. The restraint system of claim 1 further comprising a fourth engagement member mounted to the vehicle seat,
wherein the first engagement member may releasably engage the fourth engagement member when the third engagement member is in the second position to restrain a second occupant of the vehicle seat.

3. The restraint system of claim 2 further comprising:
a third restraint harness mounted to the vehicle seat and coupled to a fifth engagement member, and
a sixth engagement member coupled to the third engagement member and movable with the third engagement member between the first and second positions, the sixth engagement member being engageable with the fifth engagement member when the third and the sixth engagement members are in the first position to restrain a second occupant of the vehicle seat via the third restraint harness, and the sixth engagement member being engageable with the fifth engagement member when the third and sixth engagement members are in the second position to restrain a third occupant of the vehicle seat via the third restraint harness.

4. The restraint system of claim 3 wherein the first, second and fifth engagement members each comprise tongue members,
and wherein the third, fourth and sixth engagement members each comprise buckle members.

5. The restraint system of claim 3 further comprising at least one flexible member attached between a frame of the vehicle seat and both of the third and sixth engagement members.

6. The restraint system of claim 5 wherein the at least one flexible member comprises one or more of a web, a belt, a strap, a tether and a cable.

7. The restraint system of claim 3 further comprising a base member mounted to the frame, the base member defining the first and second positions,
and wherein the third and sixth engagement members are both coupled to the base member.

8. The restraint system of claim 2 wherein the fourth engagement member is movable between a stowed position and an operative position.

9. The restraint system of claim 8 further comprising a flexible member having one end attached to the fourth engagement member and an opposite end attached to a frame of the vehicle seat.

10. The restraint system of claim 1 further comprising a flexible member attached between the third engagement member and a frame of the vehicle seat.

11. The restraint system of claim 10 wherein the flexible member comprises one or more of a web, a belt, a strap, a tether and a cable.

12. The restraint system of claim 1 further comprising a base member mounted to the frame, the base member defining the first and second positions,
and wherein the third engagement member is coupled to the base member.

13. The restraint system of claim 1 wherein the vehicle seat is a bench-type vehicle seat.

14. The restraint system of claim 1 wherein the vehicle seat is a school bus seat.

15. The restraint system of claim 1 wherein the vehicle seat defines a bight between the seat back and the seat bottom,
and wherein the third engagement member extends through, and is movable along, one of the bight and a slot defined in the vehicle seat.

16. The restraint system of claim 15 wherein the third engagement member is movable along the vehicle seat in a direction parallel with the bight.

17. The restraint system of claim 15 wherein the third engagement member is movable along the vehicle seat in a direction non-parallel with the bight.

18. A configurable restraint system for a vehicle seat, the vehicle seat having frame and a seat back and seat bottom mounted to the frame, the restraint system comprising:
a first restraint harness extending from one end of the vehicle seat and coupled to a first engagement member,
a second restraint harness extending from an opposite end of the vehicle seat and coupled to a second engagement member,
a third restraint harness mounted to the vehicle seat between the first and second restraint harnesses and coupled to a third engagement member, and
a fourth engagement member mounted on and to the frame and configured to be movable between first and second positions relative to the vehicle seat, the first position being located near a center of the vehicle seat so that the first engagement member may releasably engage the fourth engagement member to restrain a first occupant of the vehicle seat via the first restraint harness, and the second position being located between the center and the opposite end of the vehicle seat so that the third engagement member may alternatively releasably engage the fourth engagement member to alternatively restrain the first occupant of the vehicle seat via the third restraint harness.

19. The restraint system of claim 18 further comprising a fifth engagement member secured to and movable with the fourth engagement member, wherein the second engagement member may releasably engage the fifth engagement member to restrain a second occupant of the vehicle seat via the second restraint harness when the fourth engagement member is in the first position, and wherein the second engagement member may alternatively releasably engage the fifth engagement member to alternatively restrain the second occupant of the vehicle seat via the second restraint harness when the fourth engagement member is in the second position.

20. The restraint system of claim 19 wherein the vehicle seat defines a bight between the seat back and the seat bottom, the restraint system further comprising a sixth engagement member movable between operative and stowed positions relative to the vehicle seat, the operative position extending from the bight between the center and the one end of the vehicle seat, and the stowed position extending at least partially into the bight and away from the seat bottom and the seat back, wherein the sixth engagement member may be moved to the stowed position when the fourth engagement member is in the first position so that the sixth engagement member will not interfere with the first occupant of the vehicle seat, and wherein the sixth engagement member may be moved to the operative position when the fourth engagement member is in the second position so that the first engagement member may releasably engage the sixth engagement member to restrain a third occupant of the vehicle seat via the first restraint harness.

21. The restraint system of claim 19 further comprising a sixth engagement member recessed within the seat bottom between the center and the one end of the vehicle seat, wherein the first engagement member may releasably engage the sixth engagement member to restrain a third occupant of the vehicle seat via the first restraint harness when the fourth engagement member is in the second position.

22. The restraint system of claim 18
further comprising a base member secured to the vehicle frame, the base member configured to be coupled to the fourth engagement member.

23. The restraint system of claim 18 wherein the first, second and third restraint harnesses each comprise a separate combination shoulder and lap harness.

24. The restraint system of claim 18 wherein the vehicle seat defines a bight between the seat back and the seat bottom,
and wherein the fourth engagement member extends through, and is movable along, one of the bight and a slot defined in the vehicle seat.

25. The restraint system of claim 24 wherein the fourth engagement member is movable along the vehicle seat in a direction parallel with the bight.

26. The restraint system of claim 24 wherein the fourth engagement member is movable along the vehicle seat in a direction non-parallel with the bight.

* * * * *